US011176526B2

(12) United States Patent
Lee et al.

(10) Patent No.: US 11,176,526 B2
(45) Date of Patent: Nov. 16, 2021

(54) MOBILE ELECTRONIC DEVICE AND METHOD FOR ELECTRONIC PAYMENT

(71) Applicant: Samsung Electronics Co., Ltd., Gyeonggi-do (KR)

(72) Inventors: Sangmyoung Lee, Gyeonggi-do (KR); Jaesung Kim, Gyeonggi-do (KR); Seongmin Je, Gyeonggi-do (KR)

(73) Assignee: Samsung Electronics Co., Ltd ( * ) Notice: Subject to any disclaimer, the term of this patent is extended or adjusted under 35 U.S.C. 154(b) by 1070 days.

(21) Appl. No.: 15/425,487

(22) Filed: Feb. 6, 2017

(65) Prior Publication Data

US 2017/0228710 A1 Aug. 10, 2017

(30) Foreign Application Priority Data

Feb. 4, 2016 (KR) .......................... 10-2016-0014151

(51) Int. Cl.
G06Q 20/10 (2012.01)
G06Q 20/32 (2012.01)
G06Q 20/36 (2012.01)
G06Q 20/40 (2012.01)

(52) U.S. Cl.
CPC .......... *G06Q 20/102* (2013.01); *G06Q 20/32* (2013.01); *G06Q 20/322* (2013.01); *G06Q 20/36* (2013.01); *G06Q 20/40* (2013.01)

(58) Field of Classification Search
CPC ............................ G06Q 20/32; G06Q 20/102
USPC ......................................................... 705/40
See application file for complete search history.

(56) References Cited

U.S. PATENT DOCUMENTS

| 9,554,274 | B1* | 1/2017 | Castinado ............ G06Q 20/327 |
| 2011/0307377 | A1 | 12/2011 | Nelsen et al. |
| 2012/0197794 | A1 | 8/2012 | Grigg et al. |
| 2013/0297509 | A1 | 11/2013 | Sebastian et al. |
| 2014/0114856 | A1 | 4/2014 | Jung et al. |
| 2014/0214640 | A1 | 7/2014 | Mallikarjunan et al. |

(Continued)

FOREIGN PATENT DOCUMENTS

| CN | 103778533 | 5/2014 |
| CN | 104751329 | 7/2015 |

(Continued)

OTHER PUBLICATIONS

Anonymous: "Start or Join a Family Group using Family Sharing—Apple Support", XP055364112, Jan. 8, 2015, 3 pages.

(Continued)

Primary Examiner — Edward Chang
(74) Attorney, Agent, or Firm — The Farrell Law Firm, P.C.

(57) ABSTRACT

Electronic payment methods of an electronic device are provided. An electronic payment method of a first electronic device includes executing, at the first electronic device, an electronic payment application, transmitting, by the first electronic device to a payment server, a request for registration of a common use group including a second electronic device to be registered as a group member, receiving, at the first electronic device, device information of the second electronic device, performing, at the first electronic device, authentication of the second electronic device by using the device information, and transmitting, by the first electronic device, a result of the authentication to the payment server.

7 Claims, 17 Drawing Sheets

(56) References Cited

U.S. PATENT DOCUMENTS

| | | | |
|---|---|---|---|
| 2015/0294303 A1* | 10/2015 | Hanson | G06Q 20/321 235/379 |
| 2015/0348025 A1 | 12/2015 | Brown et al. | |
| 2016/0066124 A1* | 3/2016 | Chang | H04B 1/385 455/41.2 |
| 2016/0203463 A1 | 7/2016 | Bae | |

FOREIGN PATENT DOCUMENTS

| | | |
|---|---|---|
| KR | 1020100109992 | 10/2010 |
| KR | 1020120020807 | 3/2012 |
| KR | 1020130101771 | 9/2013 |
| KR | 1020150021312 | 3/2015 |
| WO | WO 2012/042262 | 4/2012 |
| WO | WO 2014/120674 | 8/2014 |
| WO | WO 2015/183574 | 12/2015 |

OTHER PUBLICATIONS

International Search Report dated May 12, 2017 issued in counterpart application No. PCT/KR2017/001266, 3 pages.
European Search Report dated May 3, 2017 issued in counterpart application No. 17154823.3-1958, 10 pages.
Chinese Office Action dated Jul. 30, 2021 issued in counterpart application No. 201710065360.3, 21 pages.

* cited by examiner

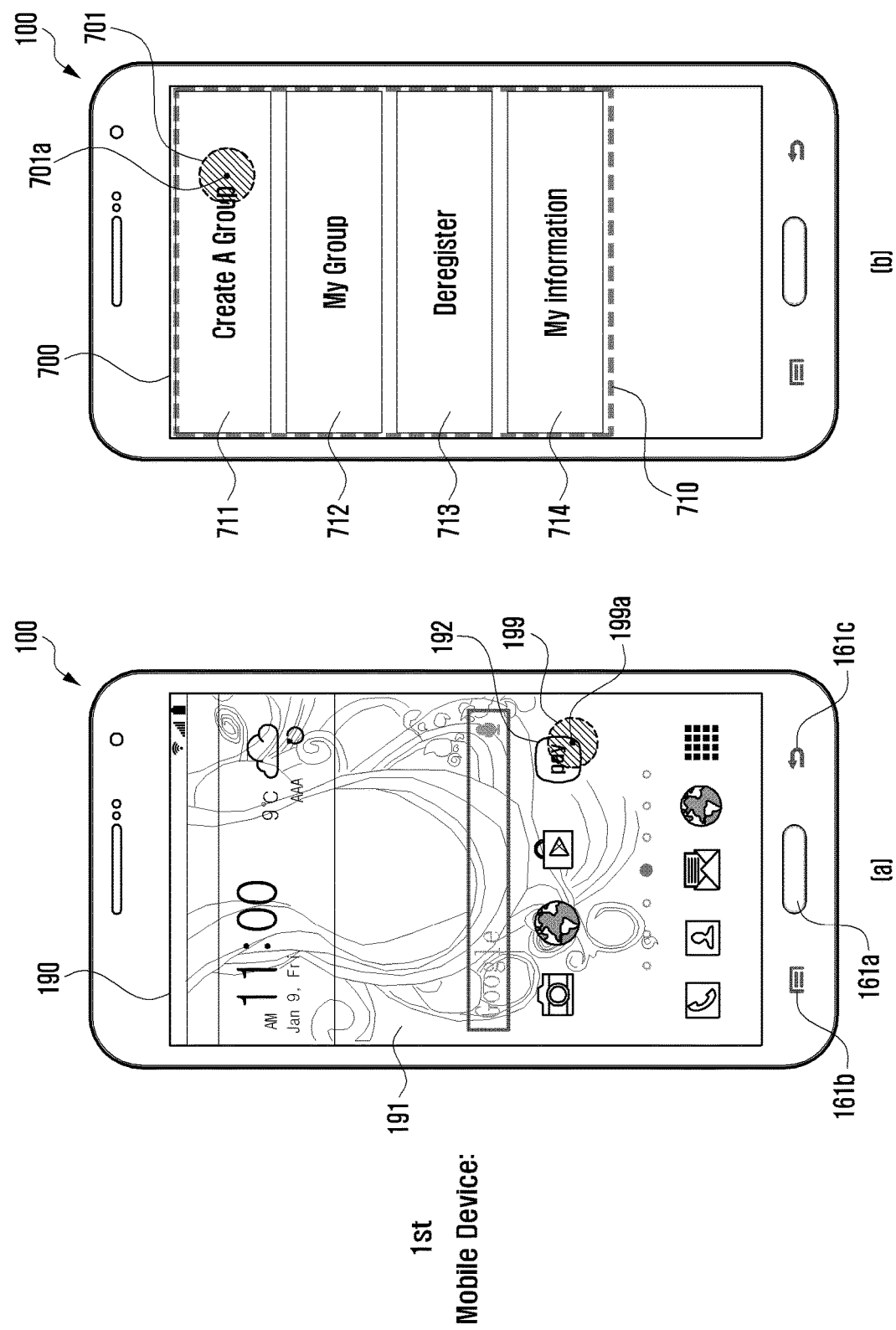

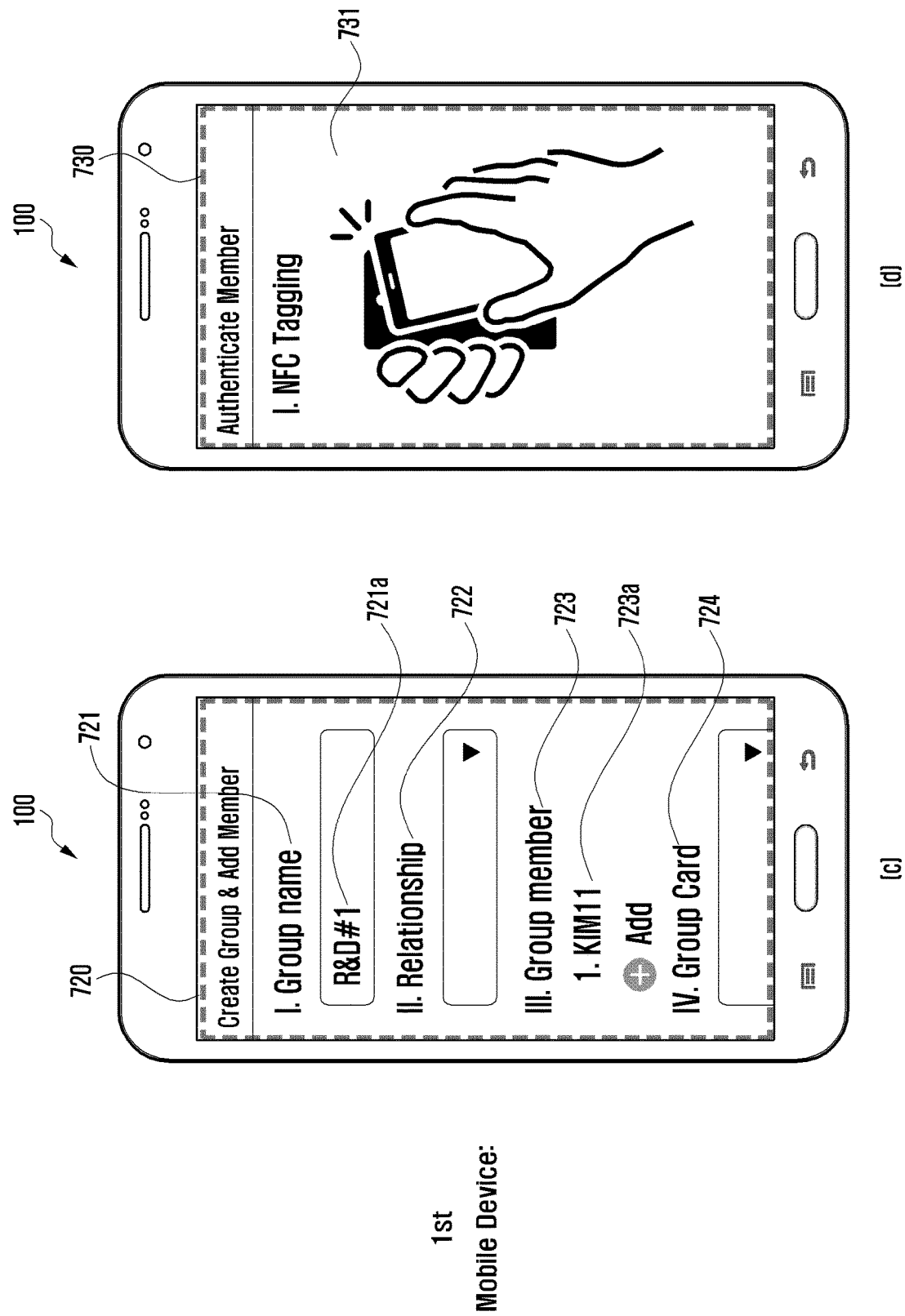

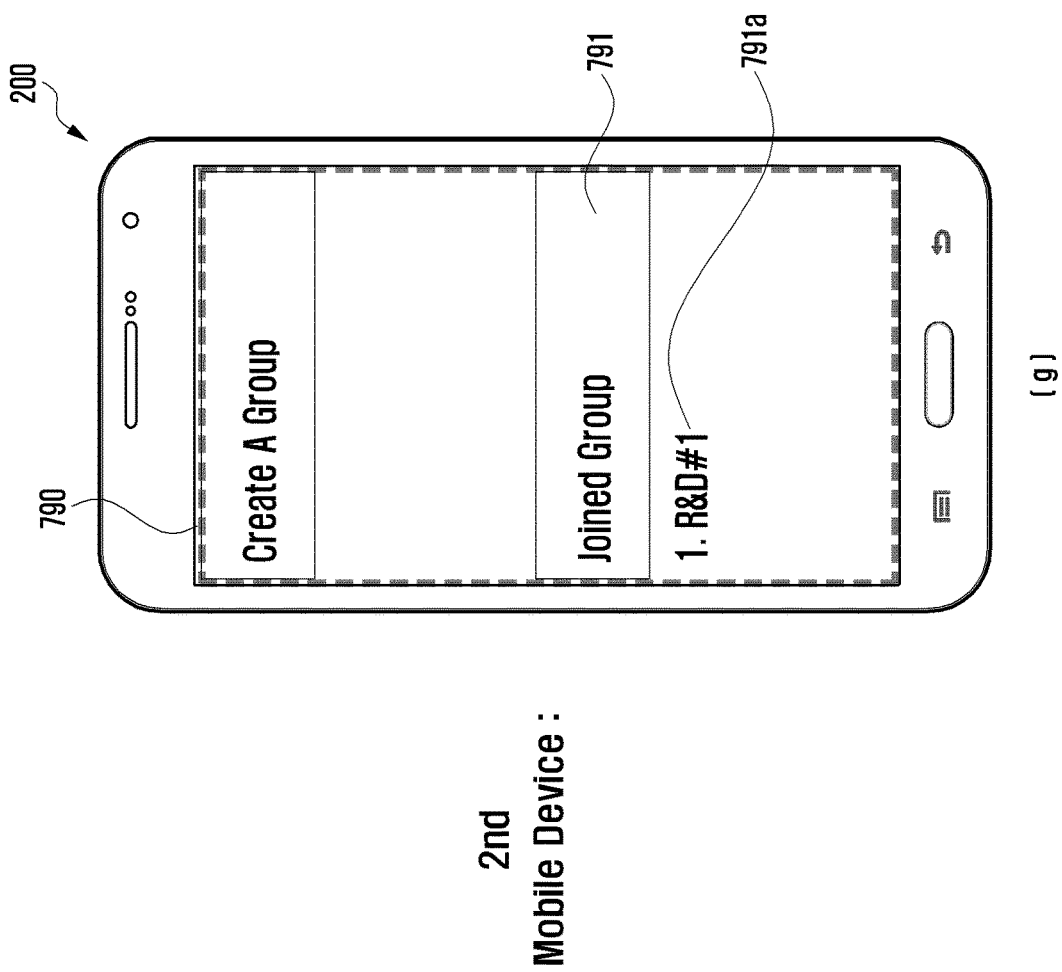

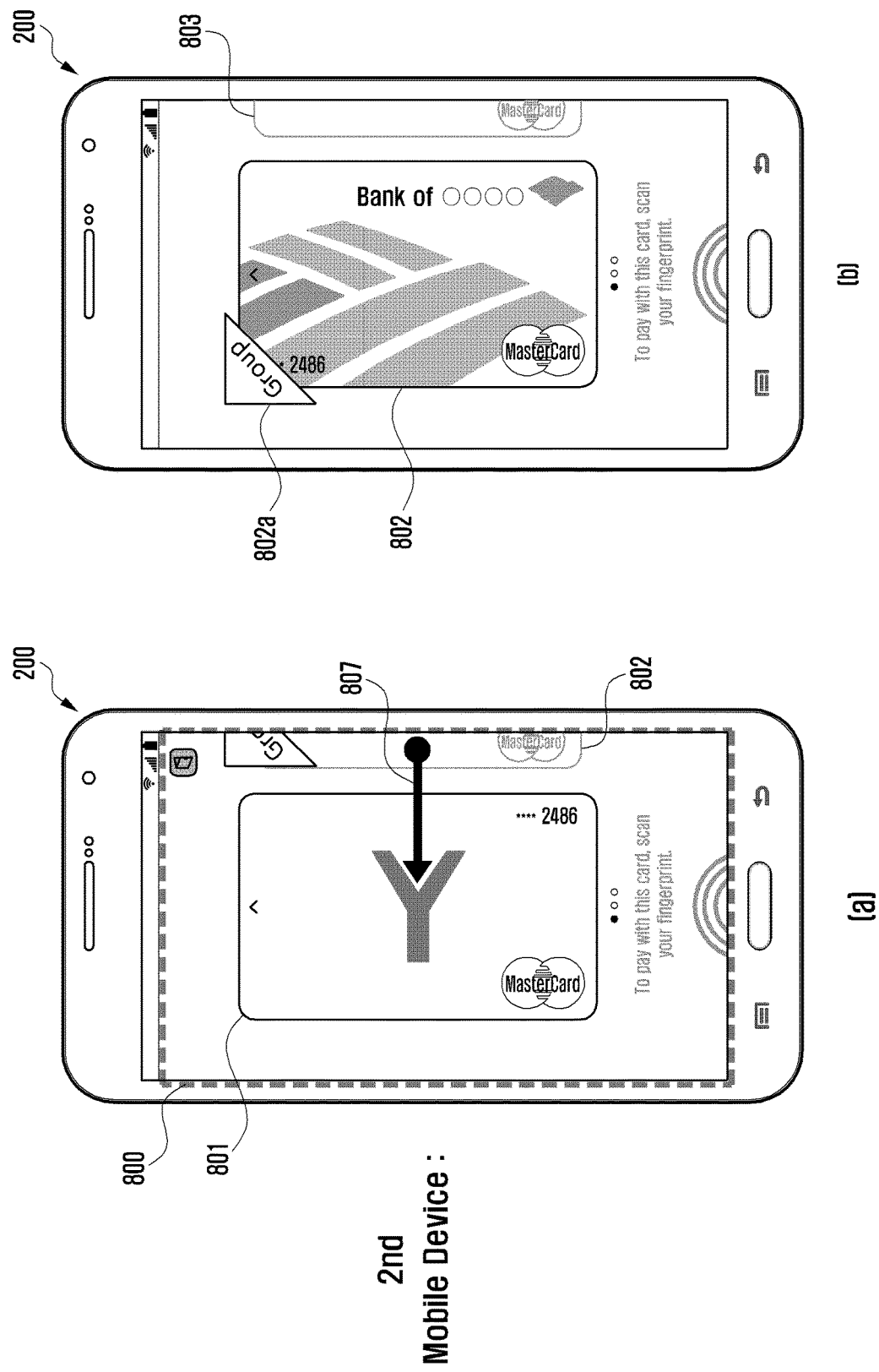

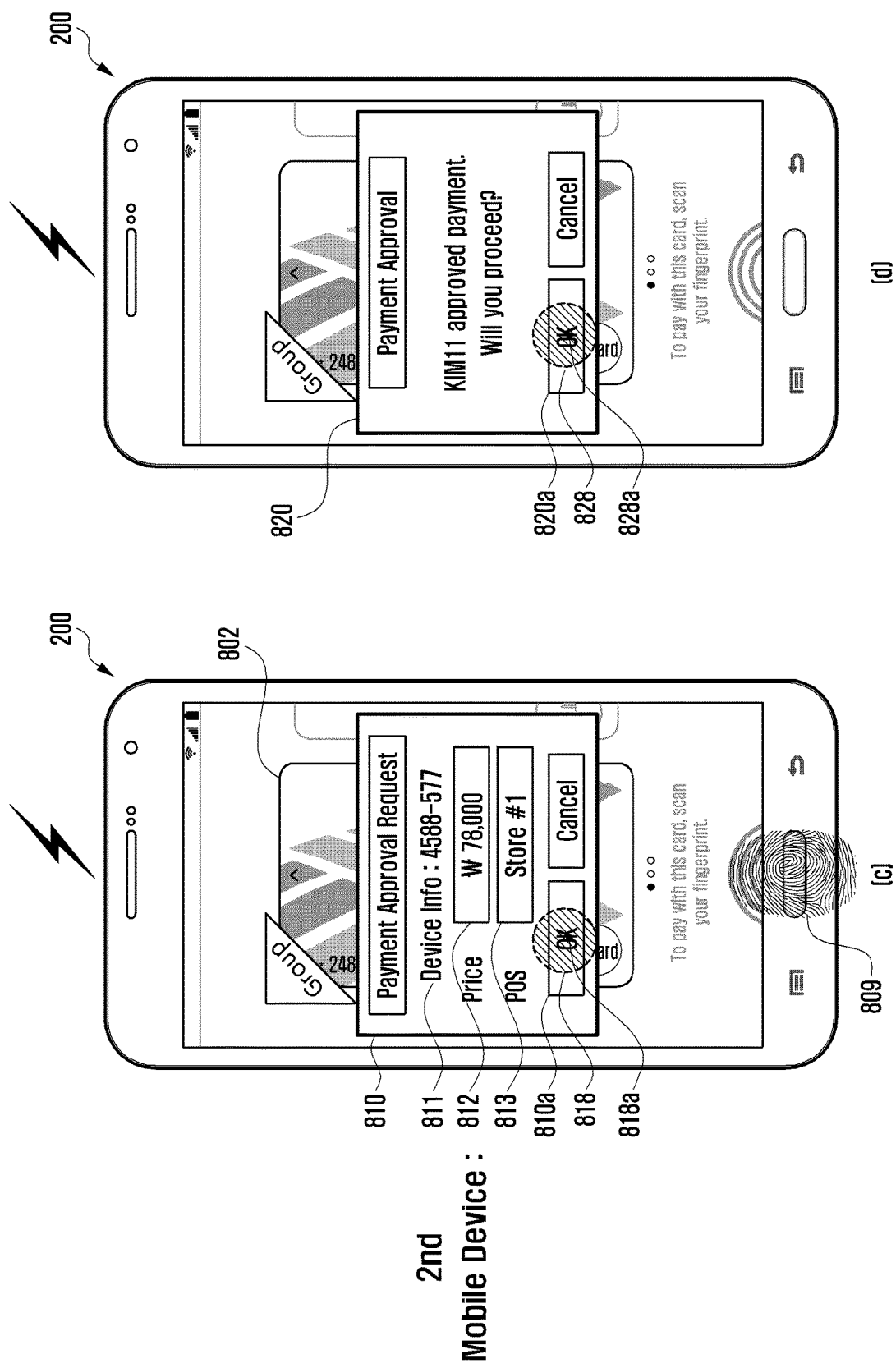

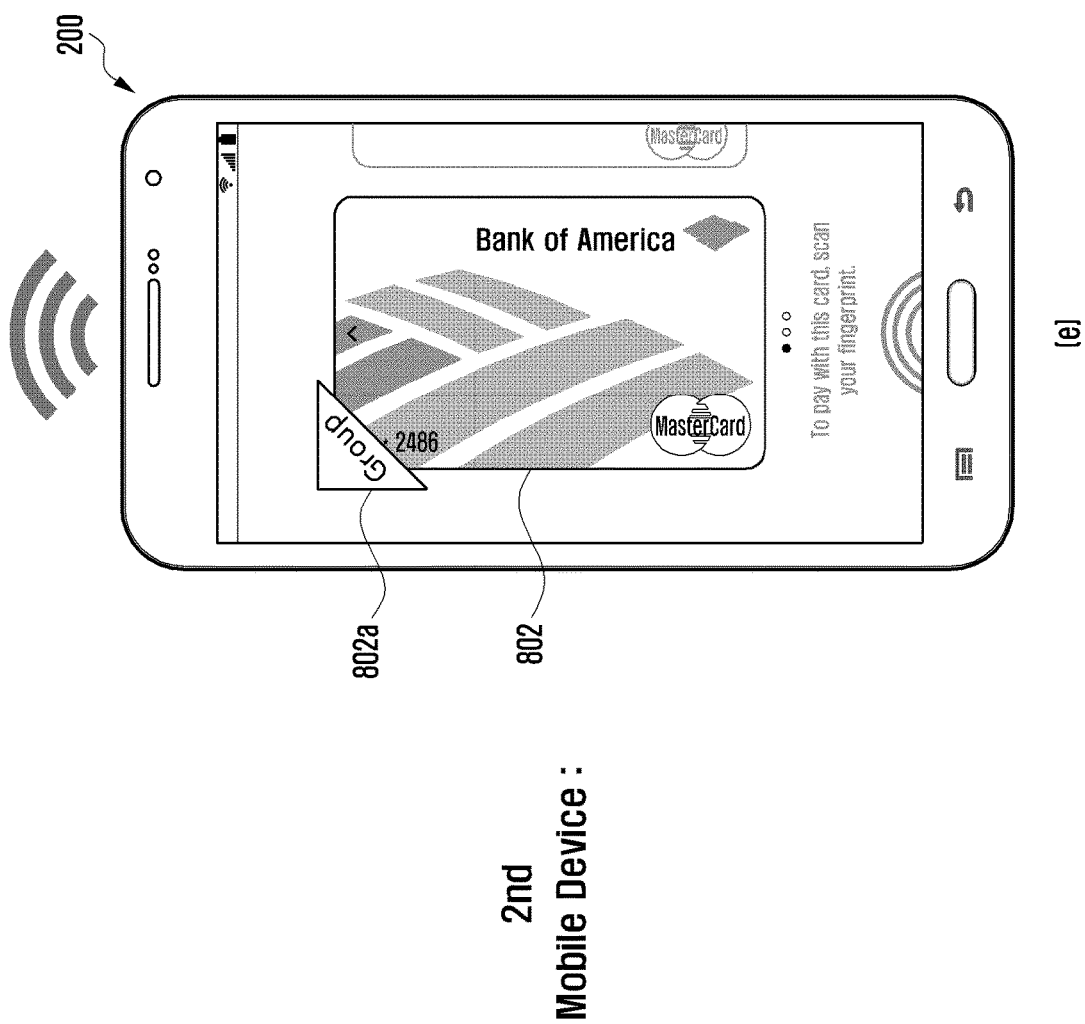

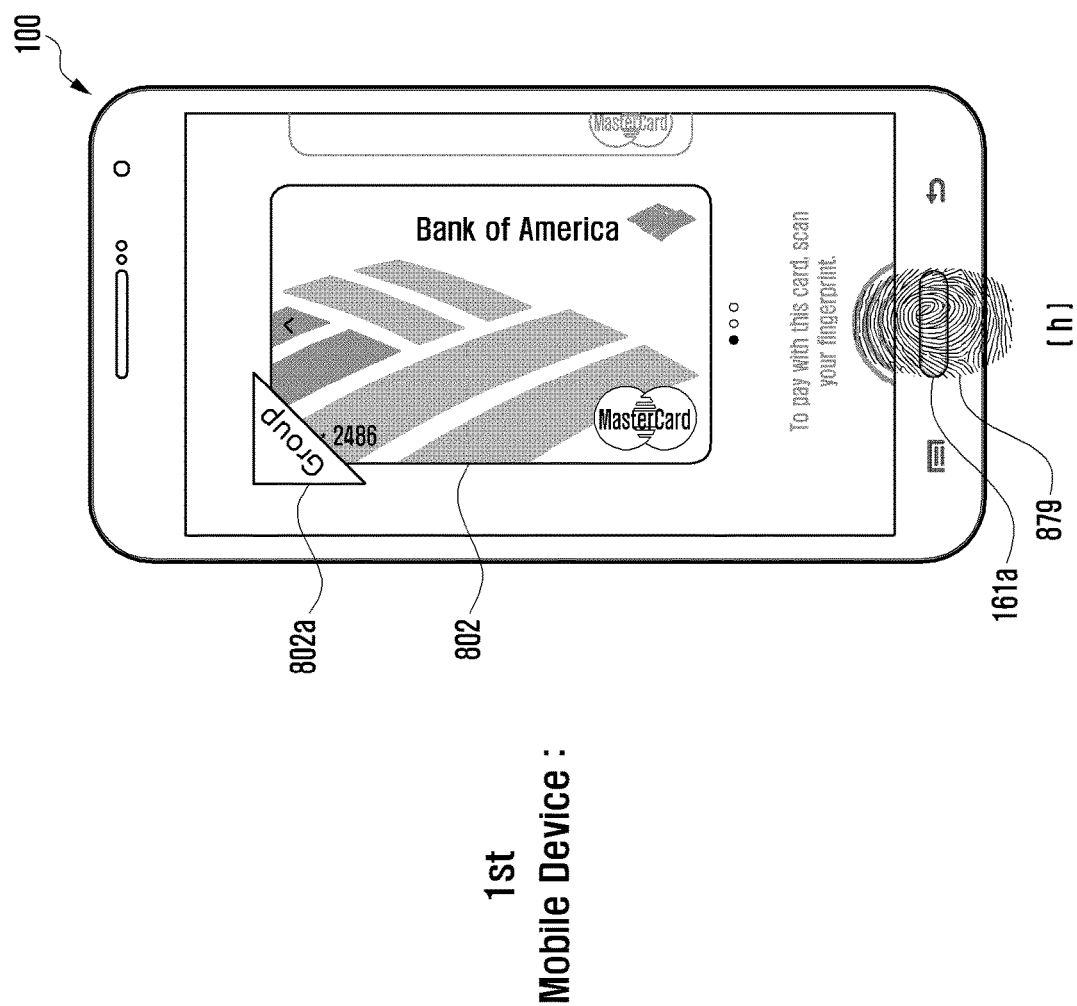

MOBILE ELECTRONIC DEVICE AND METHOD FOR ELECTRONIC PAYMENT

PRIORITY

The present application claims priority under 35 U.S.C. § 119(a) to Korean Patent Application No. 10-2016-0014151, filed on Feb. 4, 2016, in the Korean Intellectual Property Office, the disclosure of which is incorporated herein by reference.

BACKGROUND

1. Field of the Disclosure

The present disclosure relates generally to a mobile electronic device and a method for electronic payment based on a common use card (e.g., a common electronic card or a common application card).

2. Description of the Related Art

With the growth of technologies, mobile electronic devices today offer various services and functions, such as the ability to make and receive electronic or mobile payments, as well as voice call, data transmission, multitasking, and other functions. In addition, most recent mobile electronic devices use a flat touch screen, which often have rounded edges.

Normally a user who has a mobile device and desires to purchase goods online or offline may pay with an electronic card (or an application card) registered in an electronic payment service supported by the mobile device, as well as with a real credit card or cash card.

SUMMARY

The present disclosure has been made to address at least the above-mentioned problems and/or disadvantages and to provide at least the advantages described below. Accordingly, an aspect of the present disclosure is to provide a method for an owner of a common use card to create a common use group for registering other users to use the common use card.

Accordingly, another aspect of the present disclosure is to provide a method for the group owner to provide authorization for group members to make a payment using the common use card.

In accordance with an aspect of the present disclosure, a first electronic device for electronic payment is provided. The first electronic device includes a display, a communication unit, and a controller configured to execute an electronic payment application, transmit, to a payment server, a request for registration of a common use group including a second electronic device to be registered as a group member, receive device information of the second electronic device, perform authentication of the second electronic device by using the device information, and transmit a result of the authentication to the payment server.

In accordance with another aspect of the present disclosure, a second electronic device for electronic payment. The second electronic device includes a display, a communication unit, and a controller configured to receive a selection of a common use card, create payment approval request information of the common use card, transmit, to a payment server, the payment approval request information, and receive, from the payment server, payment approval information in response to the payment approval request information.

In accordance with another aspect of the present disclosure, a first electronic device for electronic payment. The first electronic device comprising a display, a communication unit, and a controller configured to receive, from a payment server, payment approval request information for a common use card requested by a second electronic device, display a notification window corresponding to the payment approval request information, receive a payment approval input in response to the payment approval request information, and transmit, to the payment server, a payment approval result.

In accordance with another aspect of the present disclosure, an electronic payment method of a first electronic device is provided. The method includes executing, at the first electronic device, an electronic payment application, transmitting, by the first electronic device to a payment server, a request for registration of a common use group including a second electronic device to be registered as a group member, receiving, at the first electronic device, device information of the second electronic device, performing, at the first electronic device, authentication of the second electronic device by using the device information, and transmitting, by the first electronic device, a result of the authentication to the payment server.

In accordance with another aspect of the present disclosure, an electronic payment method of an electronic device is provided. The method includes receiving, at the electronic device, a selection of a common use card, creating, at the electronic device, payment approval request information of the common use card, transmitting, by the electronic device to a payment server, the payment approval request information, and receiving, at the electronic device from the payment server, payment approval information in response to the payment approval request information.

In accordance with another aspect of the present disclosure, an electronic payment method of a first electronic device is provided. The method includes receiving, at a first electronic device from a payment server, payment approval request information for a common use card requested by a second electronic device, displaying, at the first electronic device, a notification window corresponding to the payment approval request information, receiving, at the first electronic device, a payment approval input in response to the payment approval request information, and transmitting, by the first electronic device to the payment server, a payment approval result.

BRIEF DESCRIPTION OF THE DRAWINGS

The above and other aspects, features, and advantages of the present disclosure will be more apparent from the following detailed description taken in conjunction with the accompanying drawings, in which:

FIGS. 7A to 7D illustrate a group card registration method of a mobile device, according to an embodiment of the present disclosure;

FIGS. 8A to 8E illustrate an electronic payment method of a mobile device, according to an embodiment of the present disclosure;

DETAILED DESCRIPTION OF EMBODIMENTS OF THE PRESENT DISCLOSURE

Figure 1:
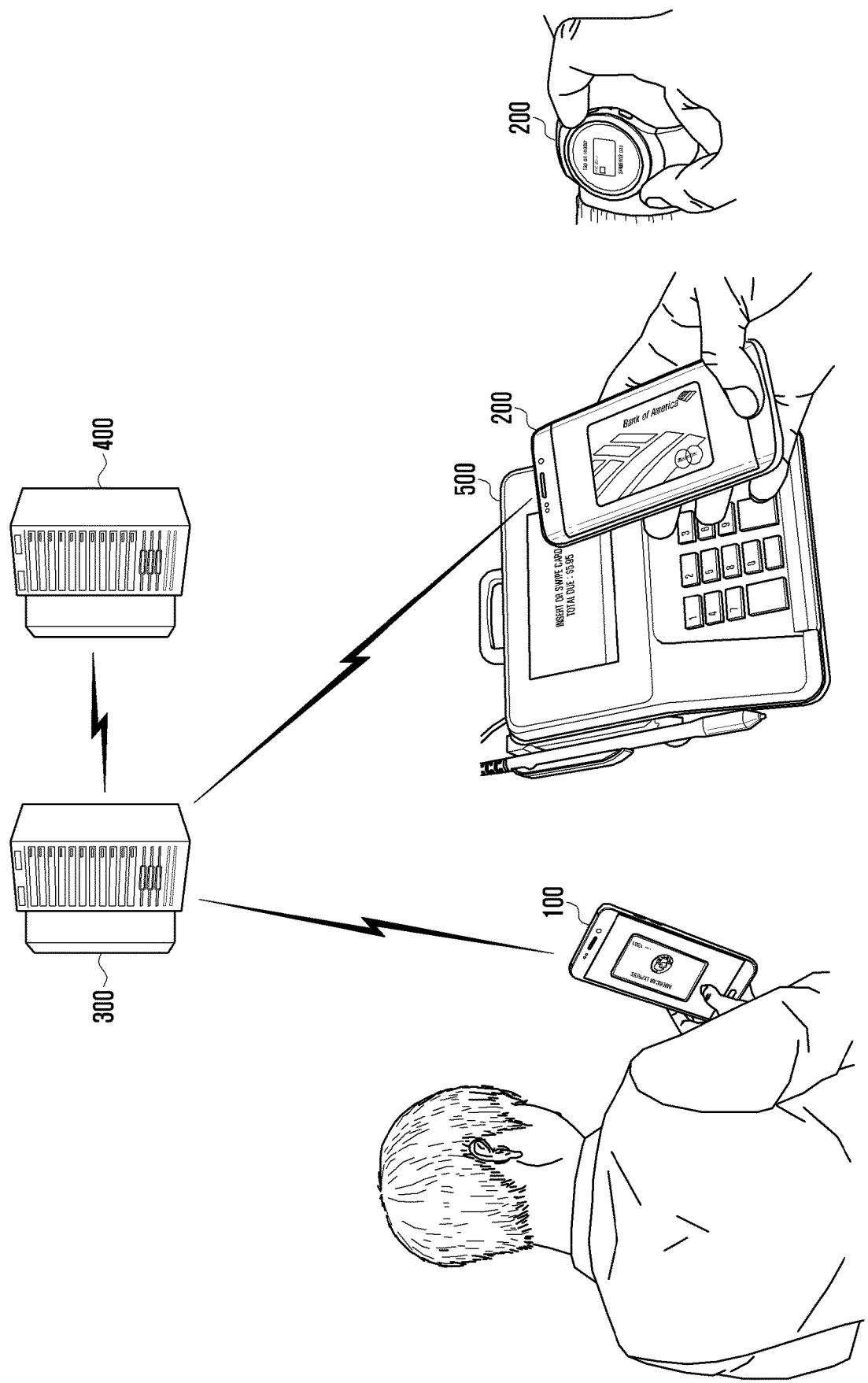
FIG. 1 illustrates a mobile payment system, according to an embodiment of the present disclosure.

Hereinafter, various embodiments of the present disclosure are described in detail with reference to the accompanying drawings, in which like reference numerals are used to refer to the same or like elements. While the present disclosure may be embodied in many different forms, specific embodiments of the present disclosure are shown in the drawings and are described herein in detail, with the understanding that such embodiments are not intended to limit the disclosure to the specific embodiments illustrated. The expressions "comprise" "include", and "have" used herein indicate the presence of a corresponding feature (e.g., a function, operation, element, characteristic, numeral, step, component, etc. or combination thereof) and do not limit additional features. In the present disclosure, the expression "or" includes any combination or the entire combination of words listed together. For example, "A or B" may include A, B, or A and B.

As used herein, the expressions "a first" and "a second" may represent various elements of the present disclosure, but do not limit corresponding elements. For example, the expressions do not limit order and/or the importance of corresponding elements. The expressions may be used for distinguishing one element from another element. For example, both a first user device and a second user device are user devices and represent different user devices. For example, a first constituent element may be referred to as a second constituent element, and similarly, a second constituent element may be referred to as a first constituent element without deviating from the scope of the present disclosure.

When it is described that an element is "coupled" to another element, the element may be "directly coupled" to the other element or "electrically coupled" to the other element through a third element. However, when it is described that an element is "directly coupled" to another element, no element may exist between the element and the other element.

Terms used in the present disclosure are not intended to limit the present disclosure, but to illustrate various embodiments of the present disclosure. As used herein, singular forms may also include plural forms unless it is explicitly indicated otherwise.

Unless differently defined, all terms used herein, including technical and scientific terms, have the same meaning as those that may be commonly understood by a person of common skill in the art. It should be understood that such terms as those defined in a generally used dictionary may be interpreted to have meanings corresponding to the contextual meanings in the related technology and are not to be interpreted to have idealized or excessively formal meanings unless explicitly so defined.

The term "application" used in this disclosure refers to a software program executed on an operating system (OS) for a computer or a mobile device, or in an external device (e.g., a server, etc.) connected to such a mobile device. For example, applications may include a web browser, a mobile payment application (also referred to as an electronic payment application or a payment application), a photo album application, a word processor, a spreadsheet, a contacts application, a calendar application, a memo application, an alarm application, a social network system (SNS) application, a game store, a chatting application, a map application, a music player, a video player, and the like.

Additionally, an application may refer to a software program executed in a mobile device in response to a user input.

Content may be outputted at a corresponding executed application, including a video file, an audio file, a text file, an image file, or a web page which is running or displayed in an application. For example, a video or audio file may be played in a video player. A music file may be played in a music player. A photo file may be displayed in a photo album application. A web page may be displayed in a web browser. Content may include payment information (e.g., a mobile card number) transmitted at an electronic payment application. Payment information may include encrypted one-time token information.

Content may include a screen of an executed application or a user interface (UI) forming such an application screen. Content may be formed of one or more content items or components.

A widget refers to a mini application which is part of a graphic user interface (GUI) that supports an efficient interaction between a user and an application or OS. For example, a widget may include a weather widget, a calculator widget, a clock widget, and the like.

A user input refers to a user's action for entering an input. For example, a user input includes a user's selection of a button or key, a user's press of a button or key, a user's touch gesture (including a non-contact gesture, such as hovering) on a touch screen, a user's voice, a user's presence (e.g., a user's appearance within a recognizable range of a camera), or any other predefined user motion. A selection of a button or key may include a press or a touch of the button or key.

The terms and words used in the following description and claims are not limited to their dictionary meanings, but are merely used to enable a clear and consistent understanding of the present disclosure. Accordingly, it should be apparent to those skilled in the art to which the present disclosure pertains, that the following description of various embodiments of the present disclosure is provided for illustration purposes only and not for the purpose of limiting the present disclosure as defined by the appended claims and their equivalents.

FIG. 1 illustrates a mobile payment system, according to an embodiment of the present disclosure.

Referring to FIG. 1, a mobile payment system providing a mobile payment service (or an electronic payment service) is shown. The electronic payment system may include a first mobile device 100, a second mobile device 200, a payment server 300, a token server 400, and a card payment terminal or point-of-sale (POS) terminal 500.

In the mobile payment system the first mobile device 100 and the second mobile device 200, each of which is capable of executing a payment application (e.g., Samsung Pay™ application), are functionally connected to the payment server 300. Also, the payment server 300 may be functionally connected to the token server 400.

The payment application executed in the mobile devices 100 and 200 offers a user interface and user experience for an electronic payment. For example, the payment application offers various user interfaces corresponding to a registration of an electronic card, a registration of a common use card, a display of an electronic card, a display of a common use card, a payment using an electronic card, a payment using a common use card, and the like.

The mobile devices 100 and 200 may have information about a card company or financial company that issues an electronic card or application card.

Also, the electronic payment system may further include a financial server, a payment network, or a purchase server.

The first and second mobile devices 100 and 200 may be connected to the payment server through the payment application. The first and second mobile devices 100 and 200 may perform an electronic payment through the payment application, via the card payment terminal 500, in a wireless manner.

The payment server 300 may manage the electronic payment service. The payment server 300 may receive payment-related information from the mobile device 100 or 200 and then deliver the payment-related information to another entity or process it directly. The payment-related information may include payment authentication information, which the payment server 300 may relay to at least one of the token server, the financial server, the payment network and the purchase server.

The payment server 300 may manage an electronic payment service account (e.g., a Samsung™ account), a device unique identification (DUID) of the mobile device, or a common use group (or group information, a group leader, a group member, common use card information, etc.) that uses a common use card in the electronic payment service account.

The payment server 300 may be connected to the mobile devices 100 and 200 in a wireless manner. The payment server 300 may be connected to the token server 400 in a wired or wireless manner.

The token server 400 may issue (for a one-time use or at the time of a card registration) and manage a token used in the electronic payment service. The token may replace card unique information such as a primary account number (PAN). The token may be created using a bank identification number (BIN). The token transmitted from the token server 400 to the payment server 300 may be one of an encrypted token or a non-encrypted token.

The token server 400 may be connected to the financial server or the purchase server in a wired or wireless manner.

The payment server 300 and the token server 400 may be implemented in a united form having a single housing or in a separate form having different housings.

The mobile devices 100 and 200 may be functionally connected to the payment server 300 through the payment application installed on each of the mobile devices 100 and 200. Through the payment application being executed, the mobile devices 100 and 200 may transmit or receive payment-related information to or from the payment server 300. The payment server 300 and the token server 400 may be functionally connected to each other and exchange payment-related information.

The financial server may correspond to a bank or financial company that issues an electronic card or application card. The financial server may perform identification and verification (ID&V) for the electronic card or application card and may also approve the payment of the electronic card. The financial server may take charge of the final approval of an electronic card payment and may receive a payment approval request from the token server 400.

The purchase server may correspond to a bank or financial company that purchases a transaction slip of an electronic card used for payment at a store. The purchase server may receive a payment approval request from the card payment terminal 500 and then transmit the request to the token server 400. The purchase server may transmit a payment approval result to the card payment terminal 500.

The financial server and the purchase server may be operated together or separately.

The first mobile device 100 may be a device corresponding to an owner (e.g., a group leader) of a common use card, which is usable through the payment application. This owner may be a user having paying authority for the common use card.

The second mobile device 200 may be a device corresponding to a group member registered to use the common use card by a group leader. The second mobile device 200 may be one or more devices. This group member may have a using authority (but not a paying authority) of a common use card.

The mobile devices 100 and 200 may include a cellular phone, a smart phone, a notebook, a tablet device, an MP3 player, a video player, a digital camera, or various kinds of wearable devices such as an accessory-type device (e.g., a watch, a ring, a necklace, etc.), a head-mounted device (HMD), a fabric or cloth-type device (e.g., electronic clothing, etc.), a body-attached type device (e.g., a skin pad, tattoo, etc.), or a body-implemented type circuit.

Figure 2:
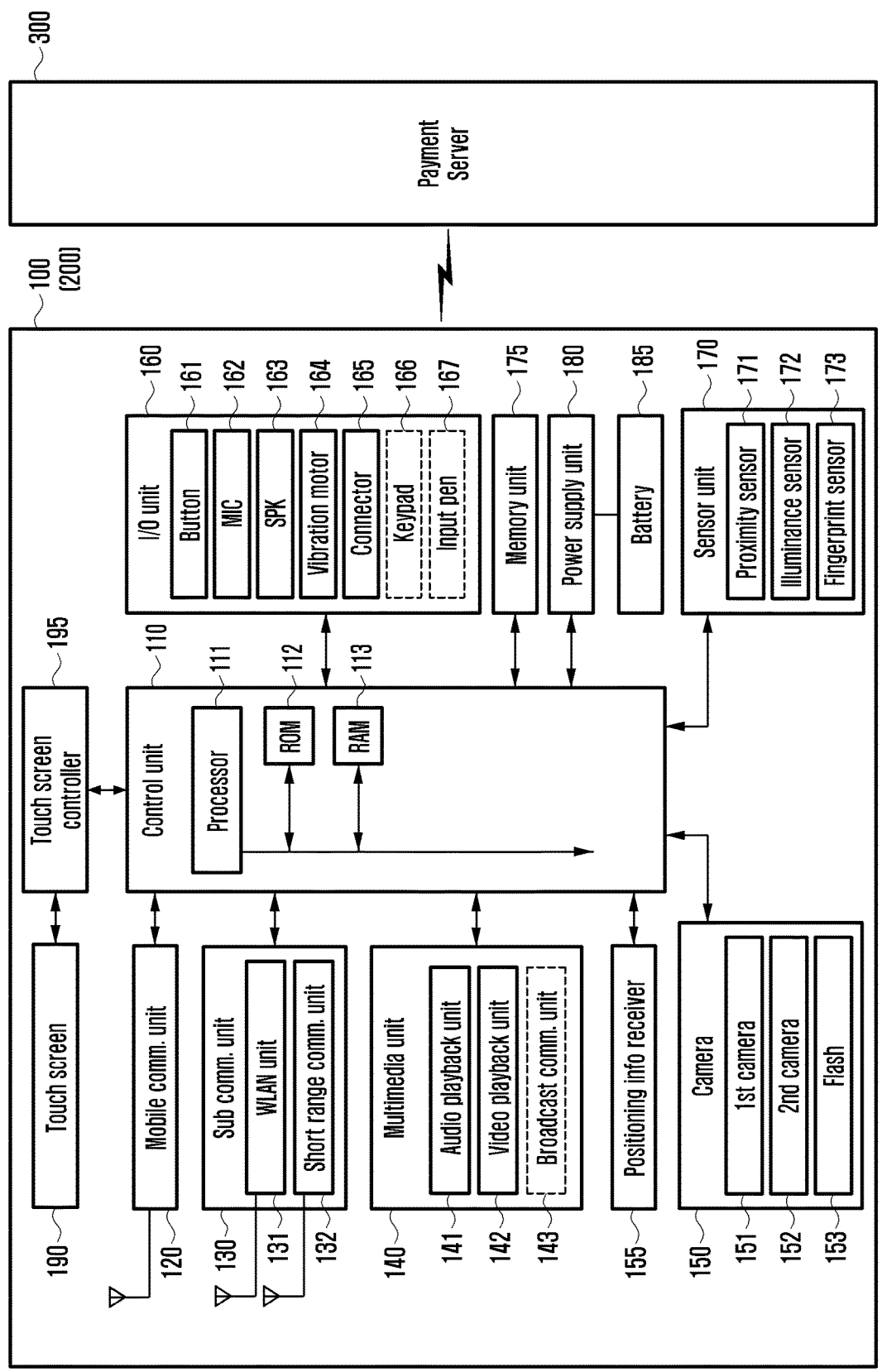
FIG. 2 is a block diagram of a configuration of a mobile device, according to an embodiment of the present disclosure.

The mobile devices 100 and 200 may refer to an electronic device which is carried by, mounted to, or attached to a user and is capable of installing and executing the payment application and displaying a common electronic card through a screen of the payment application. FIG. 2 is a block diagram of a configuration of a mobile device, according to an embodiment of the present disclosure.

Referring to FIG. 2, a configuration of the first mobile device 100 is provided. The second mobile device 200 may have the same configuration as the first mobile device 100. The first mobile device 100 may include a control unit 110, a mobile communication unit 120, a sub communication unit 130, a multimedia unit 140, a camera 150, a positioning information receiver 155, an input/output unit 160, a sensor unit 170, a memory unit 175, a power supply unit 180, a battery 185, a touch screen 190 and a touch screen controller 195.

The first mobile device 100 may be functionally connected to an external entity, such as the second mobile device 200, the payment server 300, or the card payment terminal 500 in a wireless or wired manner by using at least one of the mobile communication unit 120, the sub communication unit 130, and a connector 165. The mobile device 100 may transmit or receive data (e.g., corresponding to payment information) to or from a connected external entity in response to a user input (e.g., a selection or change of an electronic card) entered at the touch screen 190. In FIG. 2, the first mobile device 100 is shown connected to the payment server 300

The control unit 110 may include a processor 111, read-only memory (ROM) 112, and random access memory (RAM) 113. The ROM 112 stores a control program for controlling the mobile device 100, and the RAM 113 stores a signal or data received from an external entity or is used as a storage area for various tasks performed by the mobile device 100.

The control unit 110 controls an overall operation of the mobile device 100 and the other elements 120 to 195, and a signal flow between the other elements 120 to 195 in the mobile device 100, and performs a data processing function. Also, the control unit 110 controls the supply of power from the power supply unit 180 to elements 120 to 195 of the mobile device 100.

The processor 111 may include a graphic processing unit (GPU) for graphic processing. The processor 111 may further include a sensor processor for controlling a sensor or a communication processor for controlling communication.

The processor 111 may be formed of a single system on chip (SoC) having a core and the GPU. The processor 111 may include a single core, a dual core, a triple core, a quad core, and the like.

The processor 111, the ROM 112 and the RAM 113 are connected to each other through an internal bus.

The mobile communication unit 120 may be connected to an external entity through a mobile communication network by using one or more antennas under the control of the control unit 110.

The sub communication unit 130 may include a wireless local area network (WLAN) unit 131 and a short range communication unit 132. The sub communication short range communication unit 132 by using one or more antennas under the control of the control unit 110. The sub communication unit 130 may include a WLAN antenna, a magnetic secure transmission (MST) antenna, or a near field communication (NFC) antenna.

The WLAN unit 131 may be connected to an access point (AP) in a wireless manner under the control of the control unit 110. The WLAN unit 131 supports Wi-Fi communication.

Short range communication may include Bluetooth (BT), Bluetooth low energy (BLE), infrared data association (IrDA), ultra-wideband (UWB), MST, and/or NFC.

Depending on function and/or performance, the mobile device 100 may include one of the mobile communication unit 120, the WLAN unit 131, and the short range communication unit 132, or any combination thereof.

As described herein, the term "communication unit" is considered as including the mobile communication unit 120 and/or the sub communication unit 130.

The multimedia unit 140 may receive broadcasting, play audio, and/or play video under the control of the control unit 110. The multimedia unit 140 may include an audio playback unit 141, a video playback unit 142, and a broadcast communication unit 143. Accordingly, the multimedia unit 140 may perform functions corresponding to audio playback, video playback, and broadcast communication.

The audio playback unit 141 may play an audio source (e.g., an audio file having a filename extension 'mp3', 'wma', 'ogg', 'way', etc.), stored in the memory unit 175 or received from an external entity, by using an audio codec under the control of the control unit 110.

The audio playback unit 141 may output audible feedback corresponding to a payment approval of a common use card. For example, the audio playback unit 141 may output audible feedback (e.g., the output of an audio source stored in the memory unit 175) corresponding to a payment approval of a common use card through the audio codec under the control of the control unit 110.

The video playback unit 142 may play a video source (e.g., a video file having a filename extension 'mpeg', 'mpg', 'mp4', 'avi', 'mov', 'wkv', etc.), stored in the memory unit 175 or received from an external entity, by using a video codec under the control of the control unit 110.

The video playback unit 142 may output visual feedback corresponding to a payment approval of a common use card. For example, the video playback unit 142 may output visual feedback (e.g., the output of a video source stored in the memory unit 175) corresponding to a payment approval of a common use card through the video codec under the control of the control unit 110.

The broadcast communication unit 143 may receive a broadcast signal (e.g., TV broadcast signal, a radio broadcast signal, data broadcast signal, etc.) and any additional information (e.g., an electronic program guide (EPG) or an electronic service guide (ESG)) from a broadcasting station through an antenna under the control of the control unit 110.

Depending on performance or structure of the mobile device 100, the multimedia unit 140 may have only the audio playback unit 141 and the video playback unit 142 and not the broadcast communication unit 143. Also, at least one of the audio playback unit 141 and the video playback unit 142 of the multimedia unit 140 may be included in the control unit 110.

The camera 150 may capture a still image or record a video under the control of the control unit 110. The camera 150 may include a first camera 151, a second camera 152, and/or a flash 153. The first camera 151 may be a front camera and the second camera 152 may be a rear camera. The first camera 151 or the second camera 152 may have an auxiliary light source (e.g., the flash 153) that offers a sufficient quantity of light.

The camera 150 may further include an additional front camera (i.e., the third camera) adjacent to the first camera 151 (e.g., 20-80 mm distant from the first camera 151). The first camera 151 and the third camera may be integrated into a single unit. Using the first camera 151 and the third camera, the control unit 110 may obtain a three-dimensional image or video.

Similarly, the camera 150 may further include an additional rear camera (i.e., the fourth camera, not shown) adjacent to the second camera 152 (e.g., 20-80 mm distant from the second camera 152). The second camera 152 and the fourth camera may be integrated into a single unit. Using the second camera 152 and the fourth camera, the control unit 110 may obtain a three-dimensional image or video.

Using an additional lens attachable to and detachable from a separate adapter, the cameras 151 and 152 may perform a wide-angle, telescopic, and/or close-up shooting.

The positioning information receiver 155 periodically receives, from GPS satellites, a signal (e.g., orbit and time information of GPS satellites, a navigation message, etc.). Using the signal received from satellites and triangulation, the mobile device 100 can calculate a current position, time and speed thereof. For orbit or time calibration, an additional satellite may be needed.

Additionally, the mobile device 100 may detect a current position or speed thereof by using APs. The detection of position may use cell-ID technique, enhanced cell-ID technique, or an angle of arrival (AoA) technique. Also, the mobile device 100 may detect a current position or speed thereof by using a wireless beacon.

The input/output unit 160 may include at least one of a button 161, a microphone (MIC) 162, a speaker 163, a vibration motor 164, the connector 165, a keypad 166, and an input pen 167.

The button 161 includes a home button 161a, a recent executed app button 161b, and/or a back button 161c, as shown in FIG. 7A, which are disposed at a lower part of the front side of the mobile device 100. Further, the button 161 may include one or more volume buttons and a power/lock button, which are disposed at the lateral side of the mobile device 100.

The button 161 may be formed of a touch button as well as a physical button. Alternatively, the button 161 may be displayed on the touch screen 190 in the form of text, image, or icon.

The control unit 110 may receive an electric signal from the button 161 in response to a user input. Using the received signal (e.g., a press or contact of the button 161), the control unit 110 may detect a user input.

The shape, position, function and name of the button 161 are for illustration purposes only and are not to be construed as a limitation of this disclosure.

The microphone 162 receives a voice or sound from the outside and creates an electric signal under the control of the control unit 110. This electric signal may be converted at the audio codec and then stored in the memory unit 175 or outputted through the speaker 163 under the control of the control unit 110.

The microphone 162 may be disposed at one or more places of the front, lateral, and/or rear sides of the mobile device 100, as shown in FIG. 7A.

The speaker 163 may output sounds corresponding to various signals (e.g., a radio signal, a broadcast signal, an audio source, a video file, or a shutter sound) decoded by the audio codec under the control of the control unit 110.

The speaker 163 may be disposed at one or more places of the front, lateral, and/or rear sides of the mobile device 100.

The speaker 163 may output audible feedback corresponding to a payment approval of a common use card. For example, under the control of the control unit 110, the speaker 163 may output an audible feedback corresponding to a payment approval of a common use card.

The vibration motor 164 may convert an electric signal into a mechanical vibration under the control of the control unit 110. The vibration motor 164 may include a linear vibration motor, a bar-type vibration motor, a coin-type vibration motor, or a piezoelectric vibration motor.

The vibration motor 164 may be disposed at one or more places of the mobile device 100. The vibration motor 164 may vibrate the entire mobile device 100 or vibrate a part of the mobile device 100.

The vibration motor 164 may output tactile feedback corresponding to a payment approval of a common use card. Also, based on a control command of the control unit 110, the vibration motor 164 may output various tactile feedbacks (e.g., various types of vibration strength and duration) stored in advance or received from the outside.

The connector 165 may be used as an interface for connecting the mobile device 100 with an external device or a power source. The connector 165 may include a micro USB type connector or a USB-C type connector.

Through a wire cable coupled to the connector 165 and under the control of the control unit 110, the mobile device 100 may transmit data (e.g., corresponding to content) stored in the memory unit 175 to an external device or receive data (e.g., corresponding to content) from an external device. Further, through a wire cable coupled to the connector 165, the mobile device 100 may receive electric power from a power source or recharge the battery 185.

The keypad 166 may receive a user's button (or key) input for manipulating the mobile device 100. The keypad 166 may include a physical keypad partially formed at the front side of the mobile device 100 and a virtual keypad displayed on the touch screen 190. Also, the keypad 166 may further include an additional keypad connectible in a wired or wireless manner.

The input pen 167 may be inserted into and removed from the mobile device 100. The input pen 167 may select (or touch) an object (e.g., a menu, a text, an image (e.g., an electronic card), a video, a figure, an icon, a shortcut icon, etc.) and/or content (e.g., a text file, an image file, an audio file, a video file, payment information, or a web page) forming (or displayed on) a screen (e.g., a memo screen, a note pad screen, a calendar screen, etc.) of a handwriting/drawing application on the touch screen 190. Additionally, the input pen 167 may perform handwriting, drawing, painting, or sketching.

The sensor unit 170 may detect a state of the mobile device 100 and/or a surrounding state of the mobile device 100. The sensor unit 170 may include one or more sensors. The sensor unit 170 may include a proximity sensor 171 for detecting a user's approach toward the mobile device 100, an illuminance sensor 172 for detecting the quantity of light around the mobile device 100, and/or a fingerprint sensor 173 for scanning a user's fingerprint. The fingerprint sensor 173 may be disposed at the home button 161a on the front side of the mobile device 100 or on the rear side of the mobile device 100. Also, the fingerprint sensor 173 may scan a user's fingerprint through a predefined region on the touch screen 190 of the mobile device 100.

The sensor unit 170 may additionally include an acceleration sensor, a gyro sensor, a gravity sensor, an altimeter, or a biometric sensor, such as a heart rate sensor.

At least one sensor included in the sensor unit 170 detects a user's state and a state of the mobile device 100, creates a detection signal, and transmits it to the control unit 110. As well understood by those skilled in the art, the above-discussed sensors may be selectively included in or excluded from the mobile device 100.

The memory unit 175 may store, under the control of the control unit 110, a signal or data inputted or outputted in connection with operations of the mobile communication unit 120, the sub communication unit 130, the multimedia unit 140, the camera 150, the positioning information receiver 155, the input/output unit 160, the sensor unit 170, and the touch screen 190. Also, the memory unit 175 may store various control programs to be used by the control unit 110, various types of GUI associated with applications offered by a manufacturer or downloaded from an external entity, images used for offering GUI, user information, documents, database, or related data.

The memory unit 175 may store visual feedback (e.g., a video source, etc.) to be outputted through the touch screen 190, audible feedback (e.g., a sound source, etc.) to be outputted though the speaker 163, and/or tactile feedback (e.g., a haptic pattern, etc.) to be outputted through the vibration motor 164.

The memory unit 175 may store a feedback offering time (e.g., 500 msec) of a feedback to be offered to a user.

According to an embodiment, the term "memory unit" may be considered as including the memory unit 175, the ROM 112 and the RAM 113 shown in the control unit 110, and a memory card (e.g., a micro SD card, a memory stick, etc.) mounted in the mobile device 100. The memory unit 175 may include a nonvolatile memory, a volatile memory, a hard disk drive (HDD), a solid state drive (SSD), or the like.

The power supply unit 180 may supply electric power to the elements 110 to 195 of the mobile device 100 under the control of the control unit 110. The power supply unit 180 may supply electric power, received from an external power source wirelessly or through a wired cable connected to the connector 165, to the respective elements of the mobile device 100 under the control of the control unit 110.

The power supply unit 180 may recharge the battery 185 under the control of the control unit 110.

The power supply unit 180 may charge, in a wireless manner, another device (e.g., the mobile device 200, an accessory device, or a wearable device) by using a separate transmission coil connected to the battery 185 under the control of the control unit 110. This wireless charging process may use a magnetic resonance technique, electromagnetic technique, or magnetic induction technique.

The touch screen 190 may display various kinds of GUI corresponding to various services (e.g., a voice call, a video call, a data transmission, a broadcast reception, a photo capture, a video playback, or an electronic payment including a mobile payment). The touch screen 190 includes a touch panel for receiving a user input (e.g., a touch, etc.) and a display panel for displaying a screen. Also, the touch screen 190 may include an edge touch panel for receiving a user input (e.g., a touch, etc.) and an edge display panel for displaying a screen.

The touch screen 190 may transmit a signal corresponding to a single touch or multi-touch, received through the home screen 191 or a GUI, to the touch screen controller 195. The touch screen 190 may receive a single touch or multi-touch from the input pen 167 or user's body (e.g., finger).

The touch screen 190 may output visual feedback corresponding to a change to another screen in response to a touch gesture. The touch screen 190 may be included as part of a display unit of the mobile device 100.

The touch screen controller 195 receives an analog signal corresponding to a single touch or a multi-touch from the touch screen 190, converts the received analog signal into a digital signal, and transmits the digital signal to the control unit 110. Using the digital signal received from the touch screen controller 195, the control unit 110 may calculate X and Y coordinates indicating a touch point on the touch screen 190.

The control unit 110 may control the touch screen 190, using the digital signal received from the touch screen controller 195. For example, in response to a touch, the control unit 110 may highlight a selected shortcut icon to be distinguished from the others, or execute a particular application (e.g., the payment application) linked to a selected shortcut icon and then display a resultant application screen.

Although the mobile device 100 is illustrated to have a single touch screen 190 as shown in FIGS. 1 and 2, the mobile device 100 may have a plurality of touch screens. In this case, such touch screens may be contained in a single housing or in multiple housings.

For example, two or more touch screens may be disposed at upper and lower parts or left and right parts on the front side of the single housing. These touch screens may be implemented as a combination of a single display panel and a plurality of touch panels, of a plurality of display panels and a single touch panel, or of a plurality of display panels and a plurality of touch panels.

The above-discussed elements of the first mobile device 100 may be selectively added to or removed from the first mobile device 100 or modified or replaced on the basis of performance, structure, etc. of the first mobile device 100, as well understood by those skilled in the art.

The second mobile device 200 is substantially the same as the first mobile device 100. Namely, the second mobile device 200 may include the same elements 110 to 195 of the first mobile device 100.

Such elements of the second mobile device 200 may be selectively added to or removed from the second mobile device 200 or modified or replaced on the basis of performance, structure, etc. of the second mobile device 200, as well understood by those skilled in the art.

Figure 3:
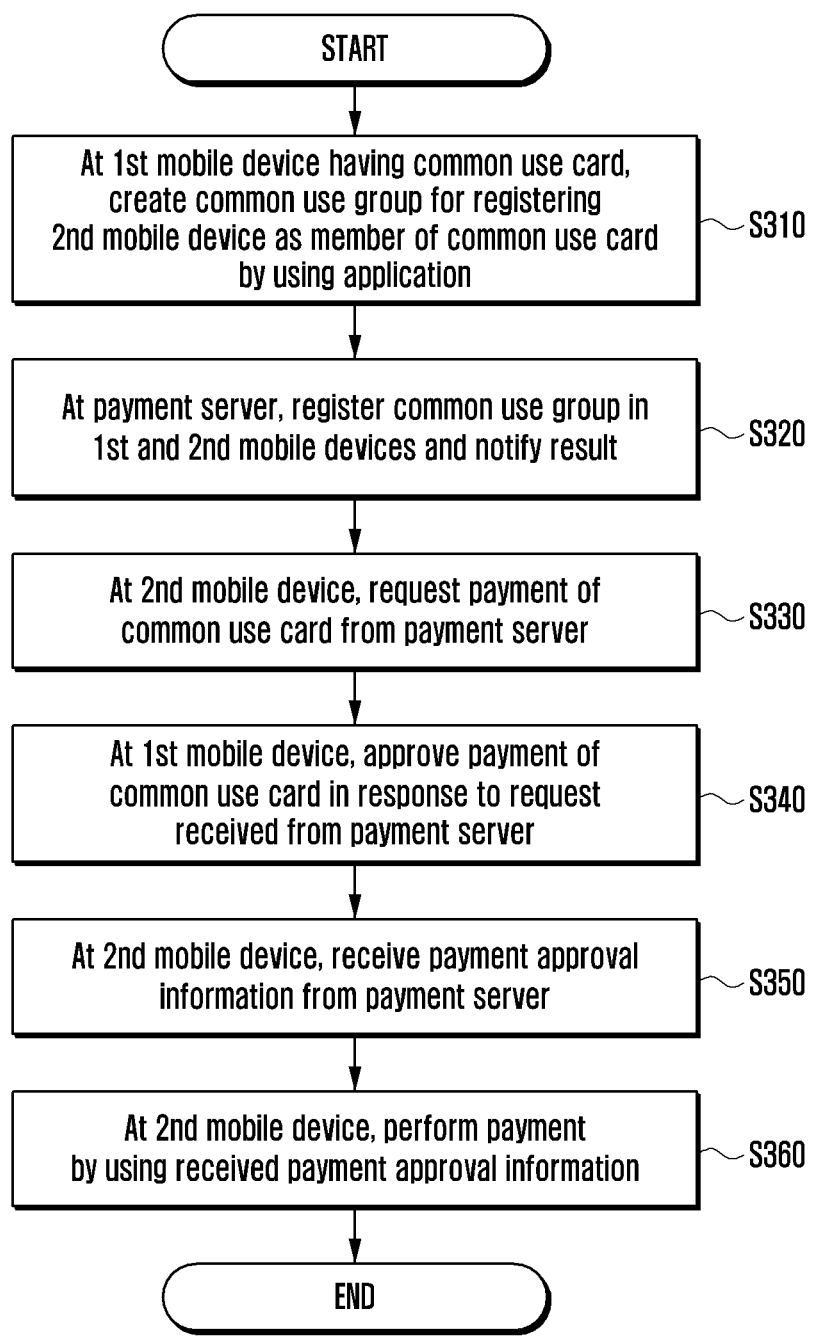
FIG. 3 is a flowchart of an electronic payment method of a mobile device, according to an embodiment of the present disclosure.
Figure 4:
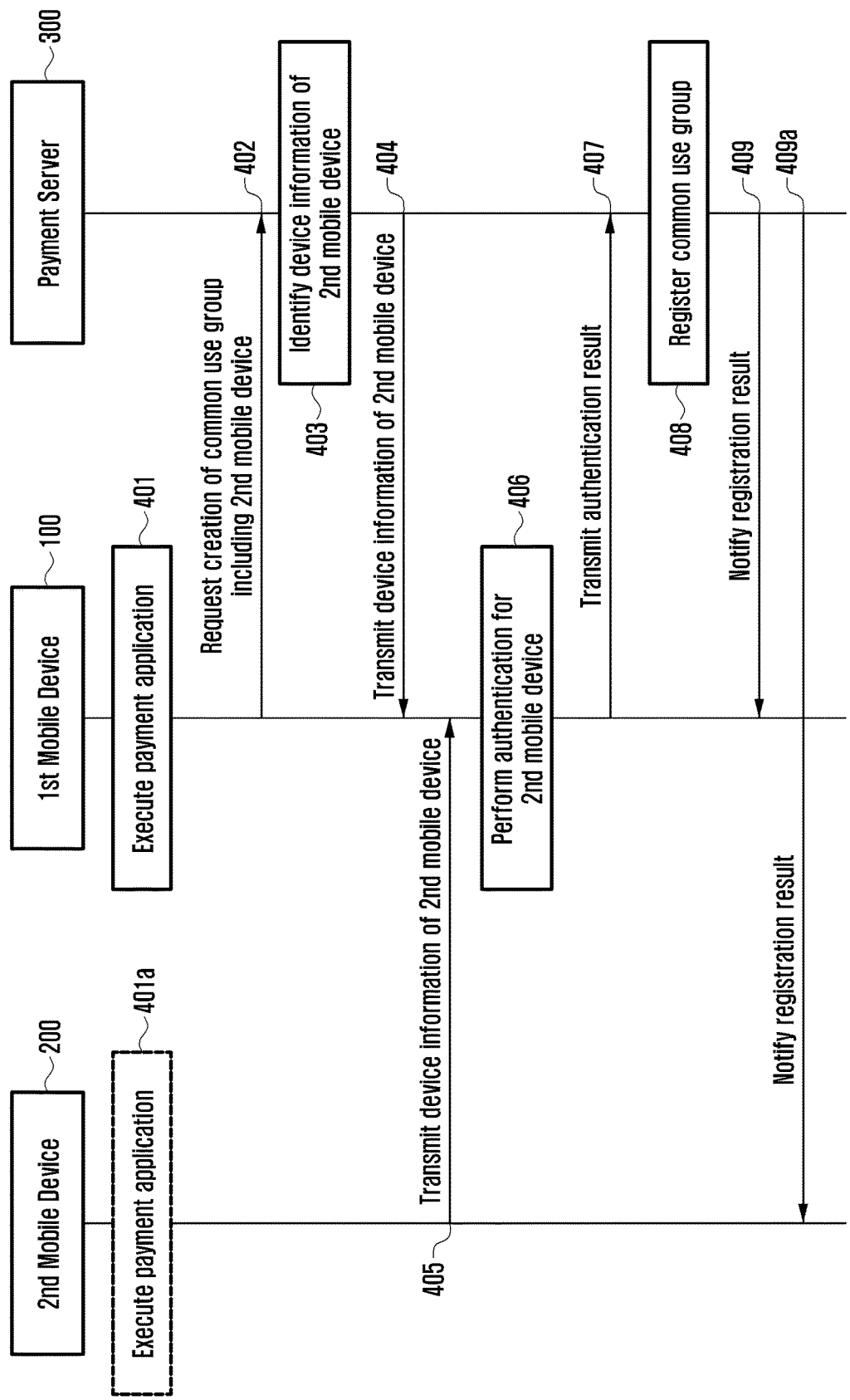
FIG. 4 is a sequence flow diagram of a group card registration method of a mobile device, according to an embodiment of the present disclosure.

FIG. 3 is a flowchart of an electronic payment method of a mobile device, according to an embodiment of the present disclosure. FIG. 4 is a sequence flow diagram of a group card registration method of a mobile device, according to an embodiment of the present disclosure. FIGS. 7A to 7D illustrate a group card registration method of a mobile device, according to an embodiment of the present disclosure.

Referring to FIG. 3, at step S310, the first mobile device 100 having a common use card (e.g., issued to a group leader) creates a common use group by registering the second mobile device 200 as a group member of the common use card through a payment application.

Step S310 will be described in detail with reference to FIGS. 4 and 7A to 7C.

Referring to FIG. 4, the first mobile device 100, the second mobile device 200, and payment server 300 are shown.

At step 401, the first mobile device 100 executes the payment application.

Referring to part (a) of FIG. 7A, a home screen 191 displayed on the touch screen 190 of the first mobile device 100 is shown. The first mobile device 100 may receive a user input for executing the payment application in order to create a common use group and add a new member, such as a user of the second mobile device 200, to the common use group. Accordingly, the first mobile device 100 may receive a first user input (e.g., a touch 199) through a shortcut icon 192 corresponding to the payment application displayed on the home screen 191 of the touch screen 190.

The control unit 110 of the first mobile device 100 may detect the first user input 199 by using the touch screen 190 and the touch screen controller 195. Using electric signals received from the touch screen controller 195, the control unit 110 may calculate the location (e.g., X1 and Y1 coordinates 199*a*) of the first user input 199.

The control unit 110 may execute the payment application corresponding to the first user input 199. Additionally, the second mobile device 200 which is to be added as a new member of the common use group may execute the payment application, as shown at step 401*a* in FIG. 4.

Referring to part (b) of FIG. 7A, a payment application screen 700 displayed on the touch screen 190 of the first mobile device 100, under the control of the control unit 110, is shown.

The payment application screen 700 which is displayed in response to the first user input 199 may be one of a plurality of screens offered by the payment application. Also, the payment application screen 700 which is displayed in response to the first user input 199 may be a screen displayed in response to one or more user inputs at the initial screen (or home screen) of the payment application.

Referring back to FIG. 4, at step 402, the first mobile device 100 requests the payment server 300 to create a common use group including the second mobile device 200.

Referring back to part (b) of FIG. 7A, a payment application menu screen 710 of the payment application of the first mobile device 100 is shown. The payment application menu screen 710 may include several menu items, such as "Create A Group" 711, "My Group" 712, "Deregister" 713, and "My Information" 714. As well understood by those skilled in the art, such menu items may be selectively added, changed or removed.

In part (b) of FIG. 7A, a second user input (e.g., a touch 701) is received through the menu item "Create A Group" 711 on the payment application menu screen 710.

The control unit 110 may detect the second user input 701 by using the touch screen 190 and the touch screen controller 195. Using electric signals received from the touch screen controller 195, the control unit 110 may calculate the location (e.g., X2 and Y2 coordinates 701a) of the second user input 701.

The control unit 110 may display a "Create Group & Add Member" screen 720 corresponding to the second user input 701.

Referring to part (c) of FIG. 7B, the "Create Group & Add Member" screen 720 displayed on the touch screen 190 in response to the second user input 701 is shown.

The "Create Group & Add Member" screen 720 may contain several items, such as "Group name" item 721, "Relationship" item 722, "Group member" item 723, and "Group card" (or Common use card) item 724.

In order to add a new member, a group leader may enter a group name, such as "R&D #1" 721a in the "Group name" item 721. Then the group leader may designate a user of the second mobile device 200 as a group member or a guest through the "Relationship" item 722.

The group leader may be registered in advance in the "Group member" item 723 as a default group member. For example, as shown in part (c) of FIG. 7B, the registered group leader is displayed as "KIM 11" 723a. If a group member is registered additionally to the common use group, the added group member may be displayed below the group leader in the "Group member" item 723.

Also, card image or card information corresponding to the common use card registered in the "Group card" item 724 may be displayed. The common use card registered as a group card may have a PAN or common use card information. The PAN may include a card number, an expiration date, and a card verification value.

The group leader may input user information (e.g., a name, a Samsung™ account, etc.) of the second mobile device 200 added as a group member in the "Create Group & Add Member" screen 720 through the payment application. After input of basic information, the group leader may select a "Register" item to request the payment server 300 to create the common use group and register the user of the second mobile device 200 as a group member.

Figure 9:
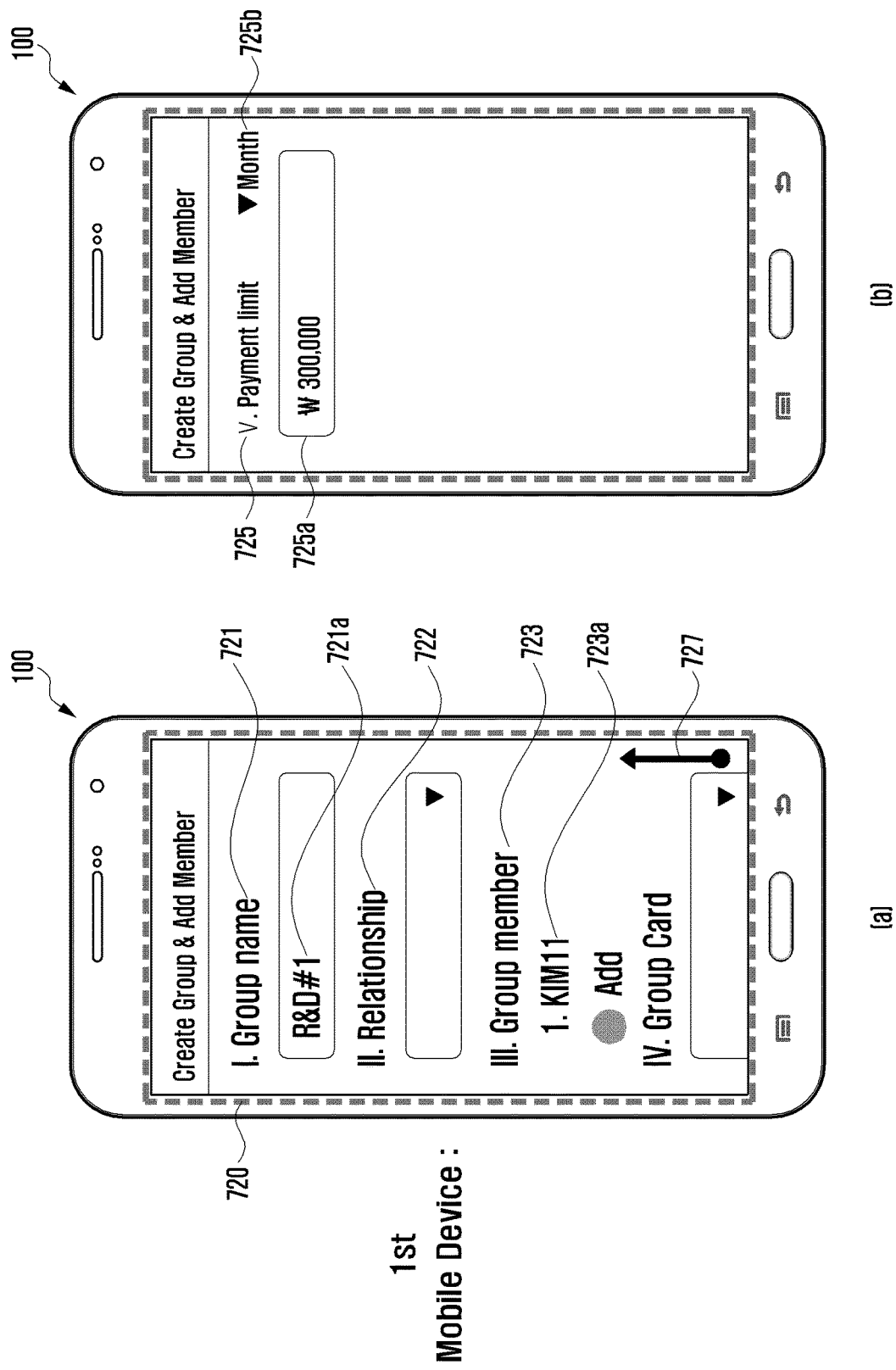
FIG. 9 illustrates an electronic payment method of a mobile device, according to an embodiment of the present disclosure.

FIG. 9 illustrates an electronic payment method of a mobile device, according to an embodiment of the present disclosure.

Referring to parts (a) and (b) of FIG. 9, the "Create Group & Add Member" screen 720 displayed on the touch screen 190 is shown. The Create Group & Add Member screen 720 may be scrolled up and down through a touch gesture (e.g., swipe or flick 727).

A "Payment limit" item 725, for setting a payment limit of the common use card, may be displayed in response to a user's scroll on the Create Group & Add Member screen 720. Then the group leader may enter or select the payment limit 725a in the Payment limit item 725.

For example, the group leader may select a setting period (e.g., daily, weekly, monthly, or yearly at 725b) of the common use card and then enter or select the payment limit 725a. After entering basic information of a group member and a payment limit of a common use card in the "Create Group & Add Member" screen 720, the group leader may select a "Register" item to request the payment server 300 to create a common use group registering the user of the second mobile device 200 as a group member and including a payment limit.

Referring back to FIG. 4, at step 403, the payment server 300 identifies device information of the second mobile device 200. Also, the payment server 300 may identify group member information.

The payment server 300 may receive a creation request of a common use group from the first mobile device 100. Then, from the received creation request of a common use group, the payment server 300 may identify account information corresponding to a group member (e.g., a user of the second mobile device 200) through a database. The device information of the second mobile device 200 may include user information (or user account information) of the user of the second mobile device 200.

Table 1, shown below, shows an example of device information (e.g., including user account information) of the second mobile device 200 stored in a data management table of the payment server 300.

TABLE 1

| Account info. | Device ID | Token ID | Group ID | Group leader info. | Group member info. |
|---|---|---|---|---|---|
| LEE22@samsung.com | 4321-5345 | 123456-240605 | | | |

Since a group member is not registered yet as a member of a common use group, some fields such as group ID, group leader information, and group member information may be blank. If a group member is already registered in another common use group rather than in a common use group in which a user of the first mobile device 100 is the group leader, a group ID and group leader information corresponding to the registered common use group may be indicated.

Herein, stored user information (or user account information) may include several items (or fields) such as account information corresponding to the electronic payment, a device ID of the second mobile device, a token ID (e.g., regardless of a creation request of a common use group) issued by the payment server 300, a group ID, group leader information, and group member information. Further, items such as a user ID, a user name, or a phone number may be selectively included.

Table 2, shown below, shows an example of device information (e.g., including user account information) of the first mobile device 100 stored in a data management table of the payment server 300.

TABLE 2

| Account info. | Device ID | Token ID | Group ID | Group leader info. | Group member info. |
|---|---|---|---|---|---|
| KIM11@samsung.com | 4578-5778 | 123456-387758 | 78YD | | LEE808@samsung.com |
| KIM11@samsung.com | 4578-5775 | 123456-247895 | | | |

A user of the first mobile device 100 may have multiple pieces of account information (e.g., a private account and a common use group account) stored in the data management table.

User information stored for a private account may be similar to that stored for a group member. For a common use group account, a group ID and group leader information corresponding to the registered common use group may be stored together with account information, a device ID and a token ID.

Since user information (or user account information) of the first mobile device 100 has substantially the same items (or fields) as that of the second mobile device 200, a description thereof will be omitted.

The payment server 300 may identify device information of the second mobile device 200 by using the stored data management table.

The payment server 300 may restrict a payment of a common use card by a group leader and/or a group member through the payment limit 725*a* set for the common use card. For example, if the payment limit is $300, the payment server 300 may deny a payment approval request exceeding the payment limit.

The payment server 300 may send a reply (e.g., a payment denial) to such a payment approval request exceeding the payment limit 725*a*, to the requesting group member. This reply may be transmitted through the payment application. Also, the payment server 300 may notify a group member and/or a group leader of the amount of the payment which exceeds the payment limit.

Figure 10:
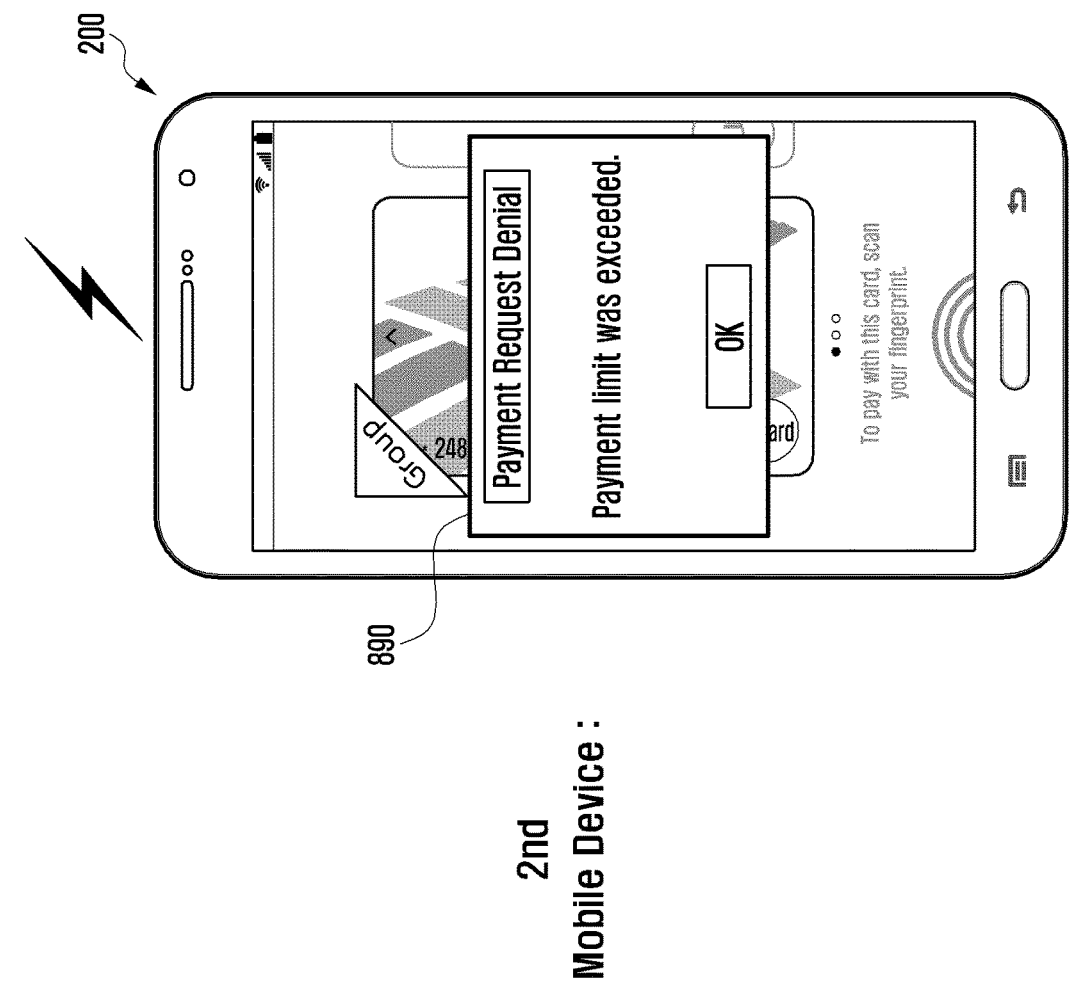
FIG. 10 illustrates an electronic payment method of a mobile device according to still another embodiment of the present disclosure.

FIG. 10 illustrates an electronic payment method of a mobile device according to still another embodiment of the present disclosure.

Referring to FIG. 10, the second mobile device 200 displaying a notification window 890 indicating that the payment limit 725*a* of a common use card was exceeded is shown. The notification window 890 may display a message regarding an excess over the payment limit 725*a* of the common use card or a message regarding a denial of a payment request. Also, the notification window 890 may further display the amount of an excess over the payment limit.

Referring back to FIG. 4, at step 404, the payment server 300 transmits device information of the second mobile device 200 to the first mobile device 100.

The first mobile device 100 receives device information of the second mobile device 200 from the payment server 300. This device information may refer to user account information of the second mobile device 200. Also, the payment server 300 may notify the second mobile device 200 that device information of the second mobile device 200 is transmitted to the first mobile device 100.

The device information of the second mobile device 200 received from the payment server 300 may be stored temporarily in the memory unit 175 of the first mobile device 100.

When device information of the second mobile device 200 is received from the payment server 300, the control unit 110 of the first mobile device 100 may change the "Create Group & Add Member" screen 720 of the payment application to an "Authenticate Member" screen 730.

Referring to part (d) of FIG. 7B, the "Authenticate Member," screen 730 of the payment application of the first mobile device 100 is shown.

In the "Authenticate Member" screen 730, a mode (e.g., NFC tagging 731, etc.) of receiving device information of the second mobile device 200 may be displayed. The NFC tagging 731 an example of one method of receiving the device information of the second mobile device 200, and other modes such as radio frequency identification (RFID) tagging, quick response (QR) code scan, or barcode scan may be used for receiving device information of the second mobile device 200.

As well understood by those skilled in the art, other techniques, such as the above-discussed short range communication or mobile communication may be also used for receiving device information of the second mobile device 200.

When transmitting device information of the second mobile device 200 to the first mobile device 100, the payment server 300 may notify the second mobile device 200 that device information of the second mobile device 200 is transmitted to the first mobile device 100.

When a notification of transmitting device information of the second mobile device 200 to the first mobile device 100 is received from the payment server 300, the second mobile device 200 may display an "Authenticate Member" screen 770 through the payment application executing on the second mobile device 200.

Figure 7C:
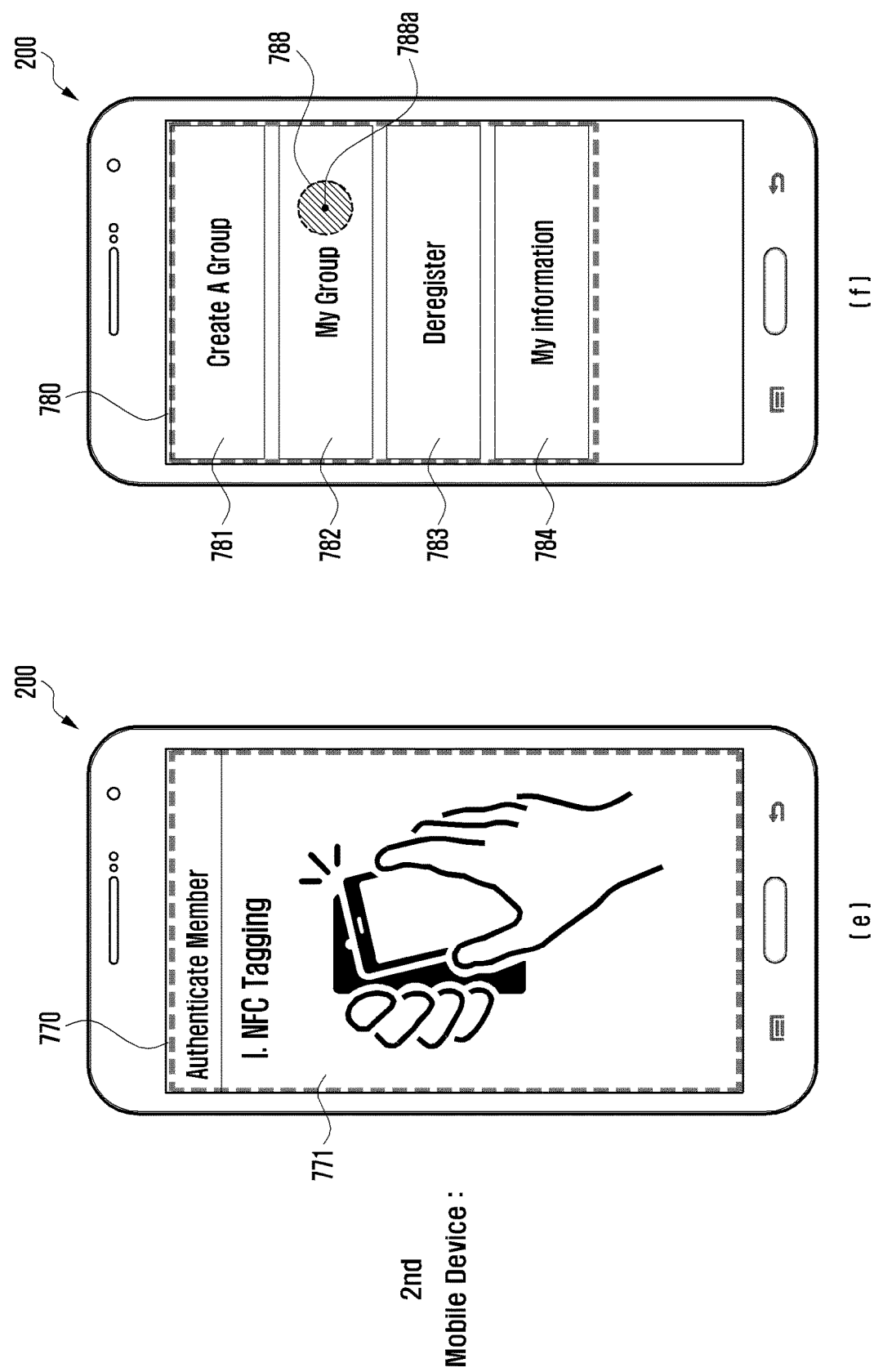

Referring to part (e) of FIG. 7C, the "Authenticate Member" screen 770 of the payment application of the second mobile device 200 is shown.

The "Authenticate Member" screen 770 displayed in the payment application of the second mobile device 200 is the substantially same as the "Authenticate Member" screen 730 displayed the payment application of the first mobile device 100, as shown in part (d) of FIG. 7B.

Referring back to FIG. 4, at step 405, the first mobile device 100 receives device information of the second mobile device 200 from the second mobile device 200.

Through NFC tagging between the first and second mobile devices 100 and 200, the first mobile device 100 may receive device information of the second mobile device 200.

In response to NFC tagging between the first and second mobile devices 100 and 200, the second mobile device 200 may transmit stored device information (as shown in Table 1) of the second mobile device 200 through the mobile communication unit 120.

At step 406, the first mobile device 100 authenticates the second mobile device 200.

The first mobile device 100 may authenticate the second mobile device 200 by using the device information of the second mobile device 200 received from the payment server 300 (i.e., first device information) and device information of the second mobile device 200 received from the second mobile device 200 (i.e., second device information). Namely, the first mobile device 100 may compare the first device information of the second mobile device 200 with the second device information of the second mobile device 200 through the payment application. If the first device information is identical to the second device information, the first mobile device 100 may authenticate the second mobile device 200.

If the first device information and the second device information are different, the first mobile device 100 may fail to authenticate the second mobile device 200. Then the first mobile device 100 may display a notification window corresponding to an authentication failure of the second mobile device 200.

If the first device information and the second device information are different from each other, the first mobile device 100 may request re-authentication for the second mobile device 200. In this case, the first mobile device 100 may display a notification window corresponding to re-authentication (e.g., such as a message indicating a need to re-authenticate the second mobile device or retry NFC tagging) for the second mobile device 200.

The first mobile device 100 may store authentication result information of the second mobile device 200 corresponding to a result of authentication for the second mobile device 200 in the memory unit 175 under the control of the control unit 110. The stored authentication result information may contain a success or failure in authentication of the second mobile device 200.

At step 407, the first mobile device 100 transmits an authentication result of the second mobile device 200 to the payment server 300.

Namely, the first mobile device 100 may transmit the stored authentication result information of the second mobile device 200 to the payment server 300 through the mobile communication unit 120. Also, the first mobile device 100 may transmit the stored authentication result information of the second mobile device 200 to the payment server 300 through the payment application.

Referring back to FIG. 3, at step S320, the payment server registers the common use group and notifies the first and second mobile devices 100 and 200 of the results.

Step S320 will be described in detail with reference to FIGS. 4, 7C and 7D.

Referring back to FIG. 4, at step 408, the payment server 300 registers the common use group.

The payment server 300 may store the received authentication result information of the second mobile device 200. Then, using the received authentication result information of the second mobile device 200, the payment server 300 may register a common use group.

The payment server 300 may register a common use group by using the information stored in the data management table, as shown in Tables 1 and 2.

Table 3, shown below, shows an example of registration information of a common use group stored in a data management table of the payment server 300. In Table 3, the registration information corresponds to a group member (i.e., a user of the second mobile device 200) registered in the common use group. The registration information of a common use group may be common use group information.

TABLE 3

| Account info. | Device ID | Token ID | Group ID | Group leader info. | Group member info. |
|---|---|---|---|---|---|
| LEE22@samsung.com | 4321-5345 | 123456-240605 | | | |
| LEE22@samsung.com | 4321-5345 | 123456-360227 | 78JD | KIM11@samsung.com | |

Table 3 shows that user LEE22@samsung.com (i.e., a group member of the common use group) of the second mobile device 200 is registered as a group member of the common use group. In contrast to Table 1 discussed above, Table 3 may include group ID and group leader information.

Table 4, shown below, shows an example of registration information of a common use group stored in a data management table of the payment server 300. In Table 4, the registration information corresponds to a group leader (i.e., a user of the first mobile device 100) registered in the common use group. The registration information of a common use group may be common use group information.

TABLE 4

| Account info. | Device ID | Token ID | Group ID | Group leader info. | Group member info. |
|---|---|---|---|---|---|
| KIM11@samsung.com | 4578-5778 | 123456-387758 | 78YD | PAK808@samsung.com | |
| KIM11@samsung.com | 4578-5775 | 123456-247895 | 78JD | | LEE22@samsung.com |

Table 4 shows that user KIM11@samsung.com (e.g., a group leader of the common use group) of the first mobile device 100 is registered as a leader of a common use group. In contrast to Table 2 discussed above, Table 4 may include group ID and group member information.

As well understood by those skilled in the art, the registration information of the registered common use group may include other items such as a user ID, a user name, or a phone number.

The payment server 300 may store the registration information of the common use group in the memory unit 175. Also, the payment server 300 may store such registration information according to members (e.g., a group leader, a group member) of a common use group in the memory unit 175.

At steps 409 and 409a, the payment server 300 notifies the first mobile device 100 and the second mobile device 200 of a registration result of the common use group through the payment application.

Then the first mobile device 100 may display a notification window corresponding to registration of a common use group (e.g., indicating that a new group member is registered in the common use group). Similarly, the second mobile device 200 may display a notification window corresponding to registration of a common use group (e.g., indicating that the user is registered in the common use group).

Referring to part (f) of FIG. 7C, a payment application menu screen 780 of the payment application of the second mobile device 200 is shown.

The payment application menu screen 780 displayed in the payment application of the second mobile device 200 is substantially the same as the payment application menu screen 710 displayed in the payment application of the first mobile device 700, as shown in part (b) of FIG. 7A.

In part (f) of FIG. 7C, the second mobile device 200 receives a first user input (e.g., a touch 788) through the "My Group" item 782 in the payment application menu screen 780.

The control unit 110 of the second mobile device 200 may detect the first user input 788 by using the touch screen 190 and the touch screen controller 195 of the second mobile device 200. Using electric signals received from the touch screen controller 195 of the second mobile device 200, the control unit 110 of the second mobile device 200 may calculate the location (e.g., X11 and Y11 coordinates 788a) of the first user input 788.

Then the control unit 110 of the second mobile device 200 may display a joined group screen 790 in response to the first user input 788, for indicating groups to which the user of the second mobile device 200 (i.e., a group member) belongs.

Referring to part (g) of FIG. 7D, the joined group screen 790 is shown. The joined group screen 790 may be displayed on the touch screen 190 of the second mobile device 200 in response to the first user input 788. In the joined group screen 790, a joined group name 791a (e.g., R&D #1) may be displayed in a joined group item 791.

The payment application of the first mobile device 100 may include a screen similar to the joined group screen 790 shown in part (g) of FIG. 7D, for indicating groups to which the user of the first mobile device 100 (i.e., the group leader) belongs. For example, in the joined group screen of the first mobile device 100 corresponding to a group leader, a joined group name R&D #11 corresponding to a group ID 78YD, as well as a joined group name R&D #1 may be displayed together.

The electronic payment method according to embodiments of the present disclosure includes steps of, at a first mobile device corresponding to a group leader having a paying authority for a common use card, executing an electronic payment application; at the first mobile device, transmitting a request for a registration of a common use group including a second mobile device to be registered as a group member having a using authority for the common use card; at the first mobile device, receiving first device information of the second mobile device from a payment server; at the first mobile device, receiving second device information of the second mobile device from the second mobile device through a communication; at the first mobile device, performing authentication of the second mobile device by using the first device information and the second device information; and at the first mobile device, transmitting an authentication result to the payment server.

The method may further include step of, at the first mobile device, receiving a creation result of the common use group from the payment server.

The communication may include a mobile communication, a Bluetooth communication, a Bluetooth low energy communication, an infrared data association (IrDA) communication, an ultra-wideband (UWB) communication, a magnetic secure transmission (MST) communication, or a near field communication (NFC).

The step of transmitting the request to the payment server may include step of setting a payment limit of the common use card in the common use group.

As well understood by those skilled in the art, the registration of a group card as discussed above in FIGS. 4 and 7A to 7D may be added, changed or removed depending on nations, regions, card companies, or financial companies.

Figure 5:
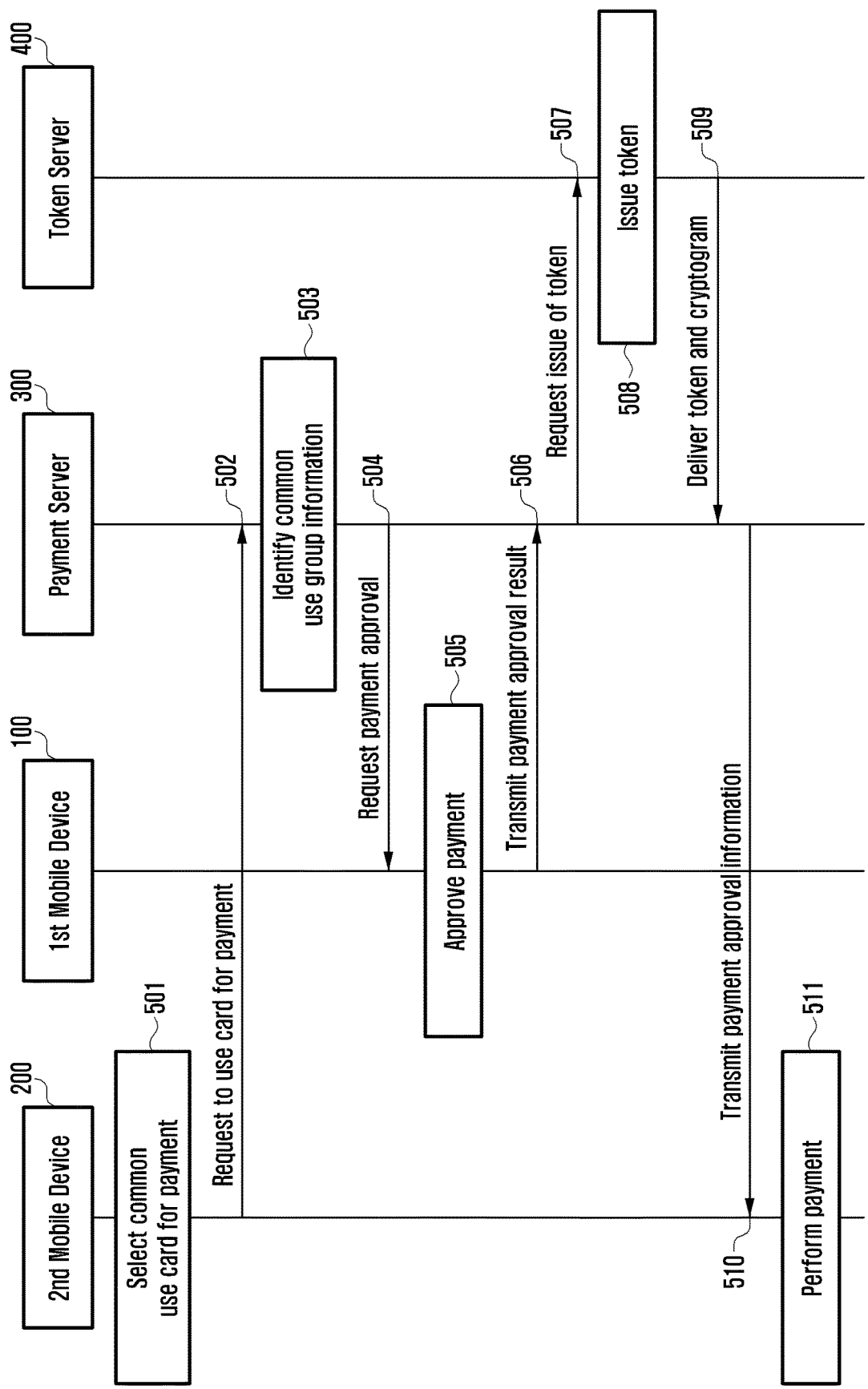
FIG. 5 is a sequence flow diagram of an electronic payment method of a mobile device, according to an embodiment of the present disclosure.

FIG. 5 is a sequence flow diagram of an electronic payment method of a mobile device, according to an embodiment of the present disclosure. FIGS. 8A to 8E illustrate an electronic payment method of a mobile device, according to an embodiment of the present disclosure.

Referring back to FIG. 3, at step S330, the second mobile device 200 requests a payment of a common use card from the payment server 300.

Step S330 will be described in detail with reference to FIGS. 5 and 8A to 8C.

Referring to FIG. 5, the first mobile device 100, the second mobile device 200. The payment server 300, and the token server 400 are shown.

At step 501, the second mobile device 200 selects a common use card for payment.

That is, a group member may pay with a common use card (e.g., a common use electronic card or a common use application card) at a POS terminal or device (e.g., a store, a restaurant, etc.). Therefore, the second mobile device 200 may execute the payment application. The second mobile device 200 may perform user authentication (e.g., a fingerprint scan through the fingerprint sensor) for the execution of the payment application.

Referring to part (a) of FIG. 8A, a payment application screen 800 of the payment application of the second mobile device 200 is shown.

In the payment application screen 800, one or more electronic cards may be displayed. An electronic card initially displayed on the payment application screen 800 may include a previously used electronic card, a default card (e.g., displayed at the execution of the payment application or a frequently used card), or an electronic card corresponding to discount information (or point saving) offered by the POS device. For example, an electronic card 801 displayed on the payment application screen 800 may be a default card determined according to a user's setting.

A group member may select a common use card through a touch gesture 807 (e.g., swipe, or flick). The touch gesture 807 may be detected in the leftward or rightward direction. This touch gesture is merely an example, and other touch gestures (e.g., a rotation, a double tap, etc.) may be used. Also, the touch gesture may be a one-finger touch gesture or a multi-finger touch gesture.

Referring to part (b) of FIG. 8A, a common use card 802 is selected in response to the touch gesture 807 of a group member. The selected common use card 802 may contain a visual tag 802a indicating a common use. This visual tag 802a may be formed of text, image, icon or symbol. The visual tag 802a may be located within or out of or overlapped with the common use card 802. The visual tag 802a may have various shapes such as circle, oval, triangle, or free curve.

The visual tag 802a may be smaller in size than the common use card 802. Additionally, the visual tag 802a may be metadata corresponding to common use card information. Also, the visual tag 802a may include a keyword or term added to the common use card information.

Referring to part (c) of FIG. 8B, a fingerprint of a group member is entered (or scanned).

The second mobile device 200 may scan a fingerprint 809 of a group member through the fingerprint sensor. Using a stored fingerprint of a group member, the second mobile device 200 may authenticate the scanned fingerprint of a group member. The second mobile device 200 may display a payment approval request screen 810.

The payment approval request screen 810 may include device information 811, a payment price 812, and a payment place name 813 (e.g., POS). A group member may enter the payment price 812 and the payment place name 813 by means of voice or through the keypad. Alternatively, the payment approval request information (e.g., the payment price 812 and the payment place name 813 in the payment approval request screen 810) may be received from the card payment terminal 500 through wireless communication between the second mobile device 200 and the card payment terminal 500 after fingerprint authentication.

The second mobile device 200 may temporarily store payment approval request information including the device information 811, the payment price 812, and the payment place name 813.

The above-mentioned items 811 to 813 in the payment approval request screen 810 may be added to (e.g., an article or product name), changed (e.g., a device name instead of the device information 811) or removed (e.g., the device information) as well understood by those skilled in the art.

Referring back to FIG. 5, at step 502, the second mobile device 200 may send a request for payment approval to the payment server 300.

Referring to part (c) of FIG. 8B, the second mobile device 200 receives a second user input (e.g., a touch 818) in the payment approval request screen 810. The control unit of the second mobile device 200 may detect the second user input 818 by using the touch screen 190 and the touch screen controller 195 of the second mobile device 200.

Using electric signals received from the touch screen controller 195 of the second mobile device 200, the control unit 110 of the second mobile device 200 may calculate the location (e.g., X12 and Y12 coordinates 818*a*) of the second user input 818.

The control unit 110 of the second mobile device 200 may transmit the payment approval request information corresponding to a payment approval request to the payment server 300 in response to the second user input 818 of a group member. For example, the payment approval request information may include the device information 811, the payment price 812, and the payment place name 813.

The control unit 110 of the second mobile device 200 may request a payment approval from the payment server 300 through the payment application in response to the second user input 818.

Referring back to FIG. 3, at step S340, the first mobile device 100 approves a payment of the common use card in response to a request received from the payment server 300.

Referring back to FIG. 5, at step 503, the payment server 300 identifies common use group information.

When the payment approval request information of a common use card is received from the second mobile device 200, the payment server 300 identifies stored common use group information (e.g., as shown in Table 3 or 4). The payment server 300 may identify the stored common use group information (e.g., as shown in Table 3) by using account information of a group member. Through the common use group information, the payment server 300 may identify a group ID (e.g., 78JD) having a group member, or group leader information (e.g., KIM11@samsung.com). Also, through the common use group information (e.g., as shown in Table 4), the payment server 300 may identify a group ID (e.g., 78JD) having a group member, or group member information (e.g., LEE22@samsung.com).

At step 504, the payment server 300 requests a payment approval from the first mobile device 100.

When group leader information or group ID corresponding to the payment approval request information of the common use card is identified, the payment server 300 sends a request for payment approval to the group leader (e.g., the first mobile device 100) corresponding to the group leader information. Namely, the payment server 300 may request a payment approval from the first mobile device 100.

At step 505, the first mobile device 100 approves the payment.

Figure 8D:
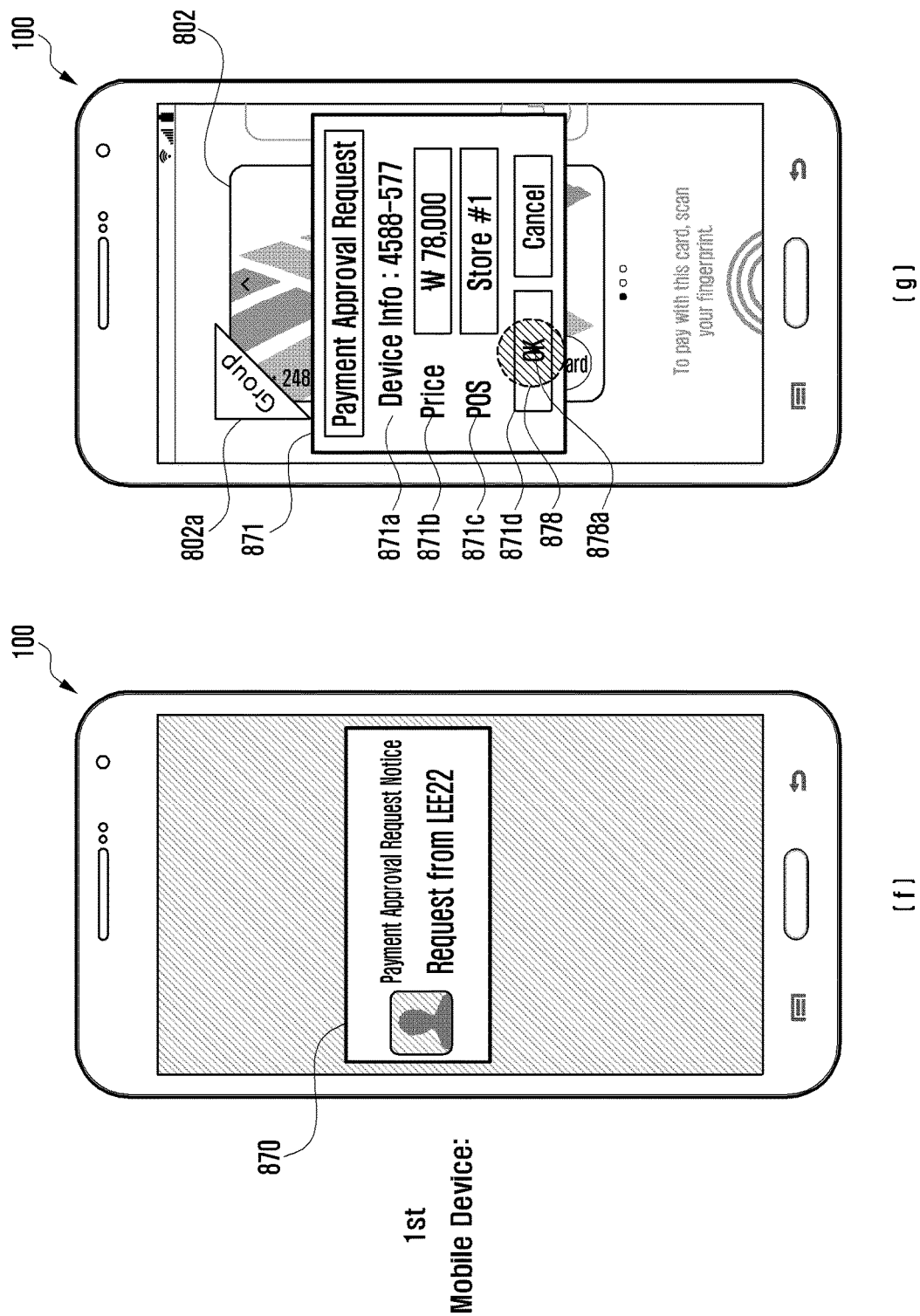

Referring to part (f) of FIG. 8D, a notification window 870 of the payment application of the first mobile device 100 is shown.

In part (f) of FIG. 8D, when a payment approval request (or payment approval request information) is received from the payment server 300, the first mobile device 100 may execute the payment application. Through the payment application, the notification window 870 may be displayed.

Referring to part (g) of FIG. 8D, a payment approval request screen 871 of the payment application of the first mobile device 100 is shown. The payment approval request screen 871 may include device information 871*a*, a payment price 871*b*, and a payment place name 871*c*, which correspond to the second mobile device 200.

In part (g) of FIG. 8D, the first mobile device 100 receives a third user input (e.g., a touch 878) in the payment approval request screen 871. The control unit 110 of the first mobile device 100 may detect the third user input 878 of a group leader by using the touch screen 190 and the touch screen controller 195 of the first mobile device 100. Using electric signals received from the touch screen controller 195 of the first mobile device 100, the control unit 110 of the first mobile device 100 may calculate the location (e.g., X13 and Y13 coordinates 878*a*) of the third user input 878. Referring to part (h) of FIG. 8E, when the third user input 878 is received (e.g., when a group leader approves a payment), a payment approval request screen may disappear.

The first mobile device 100 may scan a fingerprint 879 of a group leader through the fingerprint sensor 173. Then, using a stored fingerprint of the group leader, the first mobile device 100 may authenticate the scanned fingerprint 879 of the group leader.

Referring back to FIG. 5, at step 506, the first mobile device 100 transmits a payment approval result to the payment server.

Namely, in response to the third user input 878, the first mobile device 100 may transmit a payment approval result of a common use card to the payment server 300.

At step 507, the payment server 300 requests issuance of a token from the token server 400.

Namely, in response to the payment approval result received from the first mobile device 100, the payment server 300 may send a request for issuing a token of a common use card to the token server 400.

Also, the payment server 300 may deliver common use card information and device information (or user account information) to the token server 400.

At step 508, the token server 400 issues a token.

In response to a request for issuing a token from the payment server 300, using the received common use card information and device information, the token server 400 may issue a token. The issued token may include card information. The token may include one-time card information. Also, the token may be used for a predetermined time (e.g., three hours, one day, etc.). Additionally, the token server 400 may create cryptogram information. The token server 400 may use this cryptogram information in identifying a PAN.

The token server 400 may store the issued token. The token server 400 may compare a token returned from the card payment terminal 500 with the stored token (or approve a payment of a common use card).

At step 509, the token server 400 transmits the issued token to the payment server 300.

The token server 400 may also transmit the cryptogram information to the payment server 300. Then the payment server 300 may store the token and cryptogram information received from the token server 400.

Referring back to FIG. 3, at step S350, the second mobile device 200 receives payment approval information from the payment server 300.

Referring back to FIG. 5, at step 510, the second mobile device 200 receives payment approval information from the payment server 300.

The second mobile device 200 may receive, from the payment server 300, the payment approval result of a common use card corresponding to the payment approval information, the token and the cryptogram information.

The received token may be available only for a predetermined time. The expired token may be discarded.

At step S360, the second mobile device 200 performs a payment by using the received payment approval information.

Referring back to FIG. 5, at step 511, the second mobile device 200 performs a payment.

Referring to part (d) of FIG. 8B, a payment approval screen 820 of the payment application of the second mobile device 200 is displayed.

In response to the payment approval information received from the payment server 300, the second mobile device 200 may display the payment approval screen 820 through the payment application.

In part (d) of FIG. 8B, the second mobile device 200 receives a third user input (e.g., a touch 828) in the payment approval screen 820. The control unit of the second mobile device 200 may detect the third user input 828 by using the touch screen 190 and the touch screen controller 195 of the second mobile device 200. Using electric signals received from the touch screen controller 195 of the second mobile device 200, the control unit 110 of the second mobile device 200 may calculate the location (e.g., X13 and Y13 coordinates 828a) of the third user input 828.

Referring to part (e) of FIG. 8C, the second mobile device 200 performs a payment in response to the third user input of a group member.

The second mobile device 200 may transmit the token and cryptogram information corresponding to a payment of a common use card to the card payment terminal 500 through the short range communication unit 132 in response to the third user input 828.

The second mobile device 200 may send the token and cryptogram information corresponding to a payment of a common use card to the card payment terminal 500 through wireless communication (e.g., MST, NFC, barcode, etc.).

The card payment terminal 500 may transmit the received token, cryptogram information and common use card payment information to the purchase server. The token, cryptogram information and common use card payment information may be also delivered to the payment network and the financial server.

When the payment of a common use card is completed, the payment server 300 may transmit a payment result (e.g., receipt information) of a common use card to the first and second mobile devices 100 and 200. Alternatively, at this time, the financial server may send a payment result (e.g., receipt information) of a common use card to the first and second mobile devices 100 and 200.

Figure 6:
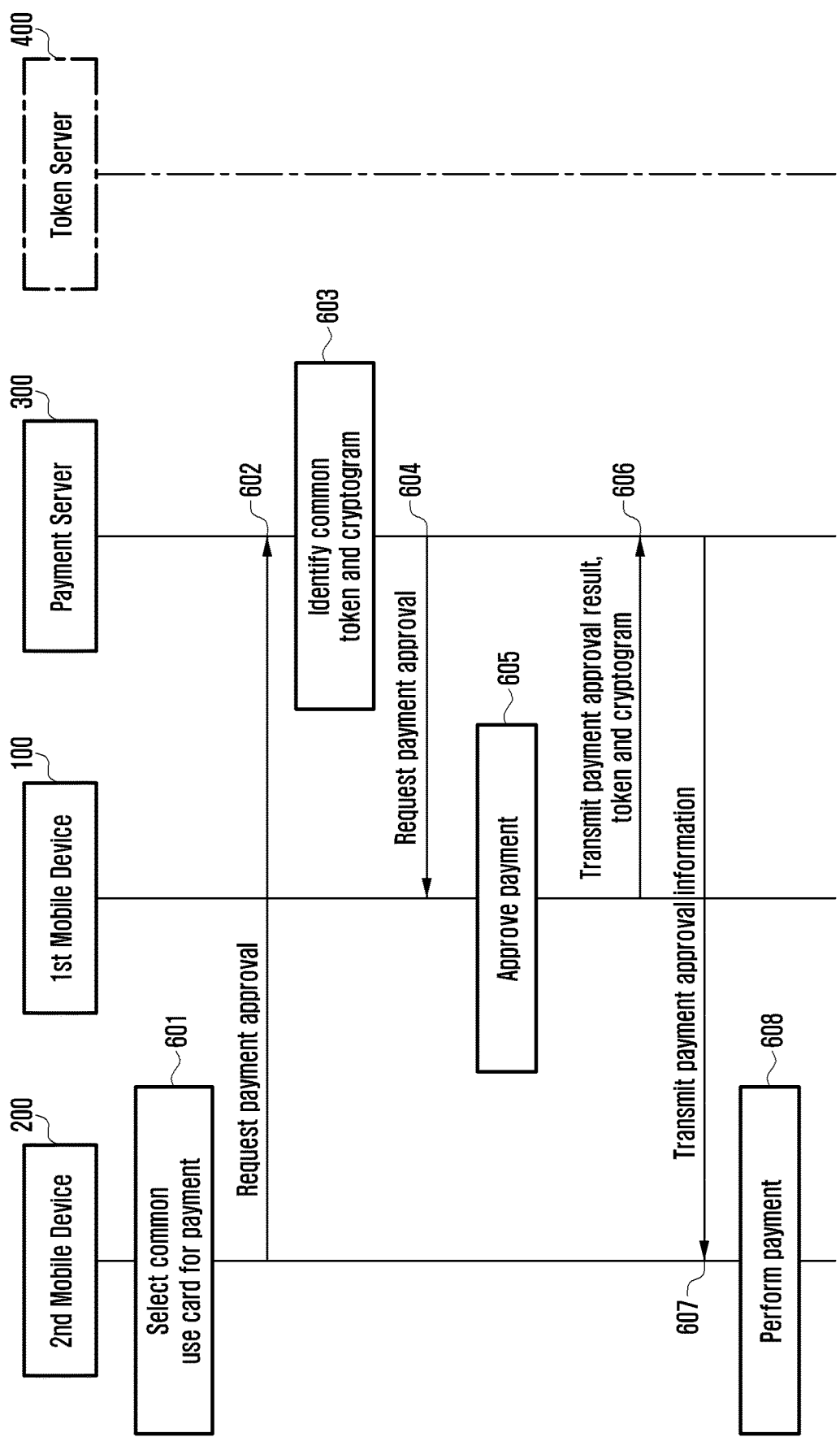
FIG. 6 is a sequence flow diagram of an electronic payment method of a mobile device, according to another embodiment of the present disclosure.

FIG. 6 is a sequence flow diagram of an electronic payment method of a mobile device, according to another embodiment of the present disclosure.

Referring to FIG. 6, the first mobile device 100, the second mobile device 200, and the payment server 300 are shown.

Steps 601 to 605 are similar to the above-discussed steps 501 to 505 of FIG. 5 and steps 607 and 608 are similar to step 510 and 511 of FIG. 5, accordingly the descriptions thereof will be omitted. Contrary to the electronic payment method shown in FIG. 5, the electronic payment method shown in FIG. 6 may be performed without the token server 400. In FIG. 6, the first mobile device 100 may perform the function of the token server 400.

At step 606, the first mobile device 100 transmits a payment approval result and a token to the payment server 300.

The first mobile device 100 may store a token corresponding to a payment of a common use card. The token stored in the first mobile device 100 may be similar to the token corresponding to common use card information used at the token server 400 and described with respect to FIG. 5.

The first mobile device 100 may transmit the payment approval result and the token corresponding to a payment of a common use card to the payment server 300. The first mobile device 100 may additionally transmit to the payment server 300 cryptogram information.

The electronic payment method according to embodiments of the present disclosure includes steps of, at a mobile device corresponding to a group member having a using authority for a common use card, receiving a selection of the common use card; at the mobile device, creating payment approval request information of the common use card; at the mobile device, transmitting the payment approval request information to a payment server; and at the mobile device, receiving payment approval information in response to the payment approval request information from the payment server.

The payment approval request information may include a payment price and payment place name of the common use card.

The payment price and payment place name of the common use card may be entered by the group member.

The method may further include step of, at the mobile device, receiving payment denial information in response to the payment approval request information from the payment server.

The payment denial information may correspond to an excess over a payment limit of the common use card.

The payment approval request information may include a first token created at a token server.

The payment approval request information may include a second token created at another mobile device corresponding to a group leader having the common use card.

The selection of the common use card may be performed by a user input of the group member.

The method may further include step of, at the mobile device, performing a payment by transmitting the received payment approval information to a card payment terminal through magnetic secure transmission.

The method may further include step of, at the mobile device, performing a payment by transmitting the received payment approval information to a card payment terminal through near field communication.

The method may further include step of, at the mobile device, offering a feedback corresponding to the payment to the group member, the feedback including at least one of a visual feedback, an audible feedback, and a tactile feedback.

The electronic payment method according to embodiments of the present disclosure include steps of, at a first mobile device corresponding to a group leader having a paying authority for a common use card, receiving, from a payment server, payment approval request information for the common use card of a second mobile device corresponding to a group member having a using authority for the common use card; at the first mobile device, displaying a notification window corresponding to the payment approval request information on a touch screen; at the first mobile device, receiving a payment approval input in response to the payment approval request information; and at the first mobile device, transmitting a payment approval result to the payment server.

The notification window may include device information, a payment price, and payment place name which correspond to the second mobile device.

The above-discussed methods may be implemented as program commands that can be written to a computer-readable recording medium and can, thus, be read by various computer-aided means. Such a computer-readable recording medium may include program commands, a data file, a data structure, etc. alone or in combination. Program commands written on the computer-readable recording medium may be designed and configured specially for the present disclosure or known to those skilled in the art of computer software. Such a computer-readable recording medium may be any type of recording device in which data can be stored in a computer-readable manner. Examples of a computer-readable recording medium include a magnetic medium such as a hard disk, a floppy disk, and a magnetic tape, an optical medium such as a compact disc (CD)-ROM or a digital versatile disc (DVD), a magneto-optical medium such as a floptical disk, a hardware device configured specially to store and execute program commands such as a ROM, a RAM, and a flash memory.

Examples of a program command include a high-level language code that can be executed in a computer by means of an interpreter, as well as a machine language code, such as created by a compiler. The hardware device may be configured to operate as one or more software modules to perform operations of the present disclosure, and vice versa.

Although certain embodiments of the disclosure have been described in detail above, it should be understood that many variations and modifications of the basic inventive concept described herein, which may be apparent to those skilled in the art, will still fall within the spirit and scope of the of the present disclosure. Accordingly, the scope of the present disclosure is defined, not by the detailed description and embodiments, but by the appended claims and their equivalents.

What is claimed is:
1. A first electronic device of a first user for electronic payment, the first electronic device comprising:
   a display;
   a cellular communication module;
   a short-range communication module;
   a memory configured to store information regarding a first credit card supporting the electronic payment, wherein the first credit card is registered as a common use card of a common use group including the first electronic device and a second electronic device in a payment server; and
   a processor;
   wherein the first electronic device is a group leader device among a plurality of electronic devices belonging to the common use group, and is authorized to use the first credit card,
   wherein the second electronic device is a group member device among the plurality of electronic devices belonging to the common use group, and is authorized to use the first credit card based on receiving, from the payment server, payment approval information indicating that a second user of the second electronic device has been authorized by the first user of the first electronic device to use the first credit card via the second electronic device,
   wherein, when registering the second electronic device as the group member device, the processor is configured to:
      execute an electronic payment application,
      transmit a request for registering the second electronic device as the group member device of the common use group to the payment server through the cellular communication module,
      receive, through the cellular communication module, first device information of the second electronic device from the payment server,
      receive, through the short-range communication module, second device information of the second electronic device from the second electronic device,
      perform authentication of the second electronic device by comparing the first device information to the second device information, and
      transmit a result of the authentication to the payment server,
   wherein, when authorizing use of the first credit card by the second electronic device, the processor is configured to:
      receive, from the payment server, the payment approval information for the first credit card requested by the second electronic device of a second user,
      display a notification window corresponding to the payment approval information,
      receive a payment approval input in response to the payment approval information, and
      transmit, to the payment server, the payment approval result.

2. The first electronic device of claim 1, wherein the request for the registration of the common use group includes a payment limit of a common use card in the common use group.

3. The first electronic device of claim 1, wherein the payment approval information includes a payment price and payment place name of the common use card.

4. The first electronic device of claim 3, wherein the payment price and payment place name of the common use card are entered by a user of the second electronic device.

5. The first electronic device of claim 1, wherein the second electronic device is configured to perform a payment by transmitting payment approval information received from the first electronic device to a card payment terminal through magnetic secure transmission.

6. The first electronic device of claim 1, wherein the processor is further configured to perform a payment by transmitting payment approval information received from the first electronic device to a card payment terminal through near field communication.

7. An electronic payment method of a first electronic device of a first user, the method comprising:
   storing information regarding a first credit card supporting the electronic payment, wherein the first credit card is registered as a common use card of a common use group including the first electronic device and a second electronic device in a payment server;
   registering the second electronic device as a group member device; and
   authorizing use of the first credit card by the second electronic device;
   wherein the first electronic device is a group leader device among a plurality of electronic devices belonging to the common use group, and is authorized to use the first credit card, wherein the second electronic device is the group member device among the plurality of electronic devices belonging to the common use group, and is authorized to use the first credit card based on receiving, from the payment server, payment approval information indicating that a second user of the second electronic device has been authorized by the first user of the first electronic device to use the first credit card via the second electronic device;

wherein the registering the second electronic device comprises:

executing, at the first electronic device, an electronic payment application;

transmitting, by the first electronic device to a payment server, a request for registering the second electronic device as the group member device of the common use group through a cellular communication module of the first electronic device;

receiving, at the first electronic device, first device information of the second electronic device from the payment server through the cellular communication module of the first electronic device;

receiving second device information of the second electronic device from the second electronic device through a short-range communication module of the first electronic device;

performing, at the first electronic device, authentication of the second electronic device by comparing the first device information to the second device information; and transmitting, by the first electronic device, a result of the authentication to the payment server, wherein the authorizing use of the first credit card by the second electronic device comprises:

receiving, from the payment server, the payment approval information for the first credit card requested by the second electronic device of the second user;

displaying a notification window corresponding to the payment approval information;

receiving a payment approval input in response to the payment approval information; and transmitting, to the payment server, the payment approval result.

\* \* \* \* \*